United States Patent
Jayasinghe et al.

(10) Patent No.: US 11,021,368 B2
(45) Date of Patent: Jun. 1, 2021

(54) CARBON NANOTUBE SHEET STRUCTURE AND METHOD FOR ITS MAKING

(71) Applicant: General Nano LLC, Cincinnati, OH (US)

(72) Inventors: Chaminda Jayasinghe, Cincinnati, OH (US); Larry Allen Christy, Cincinnati, OH (US); Edward Ming Chan, Loveland, OH (US)

(73) Assignee: General Nano LLC, Cincinnati, OH (US)

( * ) Notice: Subject to any disclaimer, the term of this patent is extended or adjusted under 35 U.S.C. 154(b) by 547 days.

(21) Appl. No.: 15/329,702

(22) PCT Filed: Jul. 30, 2015

(86) PCT No.: PCT/US2015/042911
§ 371 (c)(1),
(2) Date: Jan. 27, 2017

(87) PCT Pub. No.: WO2016/019143
PCT Pub. Date: Feb. 4, 2016

(65) Prior Publication Data
US 2017/0210627 A1   Jul. 27, 2017

Related U.S. Application Data

(60) Provisional application No. 62/030,860, filed on Jul. 30, 2014, provisional application No. 62/111,624, filed on Feb. 3, 2015.

(51) Int. Cl.
*B32B 9/00*       (2006.01)
*C01B 32/168*  (2017.01)
(Continued)

(52) U.S. Cl.
CPC .......... *C01B 32/168* (2017.08); *B32B 33/00* (2013.01); *B32B 37/0046* (2013.01);
(Continued)

(58) Field of Classification Search
CPC ....... Y10T 428/30; B82Y 30/00; B82Y 10/00; H01B 3/01
(Continued)

(56) References Cited

U.S. PATENT DOCUMENTS 4,952,317 A   8/1990   Culkin
5,254,399 A   10/1993  Oku et al.
(Continued)

FOREIGN PATENT DOCUMENTS

CN   102056353 A   5/2011
CN   103889080     6/2014
(Continued)

OTHER PUBLICATIONS

Yoon, "Controlling exfoliation in order to minimize damage during dispersion of long SWCNTs for advanced composites", Scientific Reports, vol. 4, Jan. 28, 2014; pp. 1-8.
(Continued)

*Primary Examiner* — Daniel H Miller
(74) *Attorney, Agent, or Firm* — Daniel F. Nesbitt; Hasse & Nesbitt LLC

(57) ABSTRACT

A carbon nanotube (CNT) sheet containing CNTs having a median length of at least 0.05 mm and an aspect ratio of at least 2,500; L arranged b a randomly oriented, uniformly distributed pattern, and having a basis weight of at least 1 gsm and a relative density of less than 1.0. The CNT sheet is manufactured by applying a CNT suspension in a continuous pool over a filter material to a depth sufficient to prevent puddling of the CNT suspension upon the surface of the •filter material, and drawing the dispersing liquid
(Continued)

through the filter material to provide a uniform CNT dispersion and form the CNT sheet. The CNT sheet is useful in making CNT composite laminates and structures having utility for electromagnetic wave absorption, lightning strike dissipation. EMI shielding, thermal interface pads, energy storage, and heat dissipation.

18 Claims, 9 Drawing Sheets

(51) Int. Cl.

| | | |
|---|---|---|
| *D04H 1/4242* | (2012.01) | |
| *B32B 37/10* | (2006.01) | |
| *B32B 33/00* | (2006.01) | |
| *B32B 37/00* | (2006.01) | |
| *B32B 38/00* | (2006.01) | |
| *B82Y 40/00* | (2011.01) | |
| *B82Y 30/00* | (2011.01) | |
| *B32B 37/24* | (2006.01) | |

(52) U.S. Cl.
CPC ........ *B32B 37/1018* (2013.01); *B32B 38/164* (2013.01); *D04H 1/4242* (2013.01); *B32B 2037/243* (2013.01); *B82Y 30/00* (2013.01); *B82Y 40/00* (2013.01); *C01B 2202/34* (2013.01); *Y10S 977/742* (2013.01); *Y10S 977/842* (2013.01); *Y10T 428/30* (2015.01)

(58) Field of Classification Search
USPC .......... 428/408; 977/742; 423/448; 252/501
See application file for complete search history.

(56) References Cited

U.S. PATENT DOCUMENTS

| | | |
|---|---|---|
| 5,985,112 A | 11/1999 | Fisher |
| 6,483,087 B2 | 11/2002 | Gardner et al. |
| 7,094,285 B2 | 8/2006 | Mazany et al. |
| 7,208,115 B2 | 4/2007 | Sheridan et al. |
| 7,211,320 B1 | 5/2007 | Cooper et al. |
| 7,244,407 B2 | 7/2007 | Chen et al. |
| 7,419,601 B2 | 9/2008 | Cooper et al. |
| 7,459,121 B2 | 12/2008 | Liang et al. |
| 7,799,861 B2 | 9/2010 | Lin et al. |
| 7,838,587 B2 | 11/2010 | El Bounia et al. |
| 7,931,838 B2 | 4/2011 | Marand et al. |
| 7,938,991 B2 | 5/2011 | Armeniades et al. |
| 7,955,535 B2 | 6/2011 | Liang et al. |
| 7,993,620 B2 | 8/2011 | Lashmore et al. |
| 8,021,640 B2 | 9/2011 | Kim et al. |
| 8,137,653 B1 | 3/2012 | Predtechensky et al. |
| 8,146,861 B2 | 4/2012 | Lengsfeld et al. |
| 8,246,886 B2 | 8/2012 | Lashmore et al. |
| 8,308,930 B2 | 11/2012 | Kim et al. |
| 8,351,220 B2 | 1/2013 | Liang et al. |
| 8,357,346 B2 | 1/2013 | Kim et al. |
| 8,373,157 B2 | 2/2013 | Choi et al. |
| 8,415,012 B2 | 4/2013 | Zheng et al. |
| 8,426,501 B1 | 4/2013 | Taha et al. |
| 8,455,043 B2 | 6/2013 | Chang et al. |
| 8,455,583 B2 | 6/2013 | Krishnamoorti et al. |
| 8,520,406 B2 | 8/2013 | Liang et al. |
| 8,658,897 B2 | 2/2014 | Doneker et al. |
| 8,692,137 B2 | 4/2014 | Doneker et al. |
| 8,703,355 B2 | 4/2014 | Zheng et al. |
| 8,709,292 B2 | 4/2014 | Huo et al. |
| 8,722,171 B2 | 5/2014 | Lashmore et al. |
| 8,752,279 B2 | 6/2014 | Brittingham et al. |
| 8,753,602 B2 | 6/2014 | Shanov et al. |
| 8,808,792 B2 | 8/2014 | Starkovich et al. |
| 8,847,074 B2 | 9/2014 | Mann et al. |
| 8,986,576 B1 | 3/2015 | O'Bryan et al. |
| 9,107,292 B2 | 8/2015 | Shah et al. |
| 9,817,452 B2 | 11/2017 | Evens et al. |
| 9,914,269 B2 | 3/2018 | Hopkins et al. |
| 2002/0035170 A1 | 3/2002 | Glatkowski et al. |
| 2005/0263456 A1 | 12/2005 | Cooper et al. |
| 2006/0017191 A1 | 1/2006 | Liang et al. |
| 2006/0062944 A1 | 3/2006 | Gardner et al. |
| 2006/0207931 A1 | 9/2006 | Liang et al. |
| 2008/0048364 A1 | 2/2008 | Armeniades et al. |
| 2008/0057265 A1 | 3/2008 | Liang et al. |
| 2008/0191606 A1* | 8/2008 | Geohegan .............. B82Y 30/00 313/501 |
| 2008/0308209 A1 | 12/2008 | Loutfy et al. |
| 2009/0092813 A1 | 4/2009 | Lin et al. |
| 2009/0194525 A1 | 8/2009 | Lee et al. |
| 2009/0277897 A1 | 11/2009 | Lashmore et al. |
| 2009/0280324 A1 | 11/2009 | Liang et al. |
| 2010/0021682 A1 | 1/2010 | Liang et al. |
| 2010/0024185 A1 | 2/2010 | Mayabb |
| 2010/0051471 A1 | 3/2010 | Meng et al. |
| 2010/0055450 A1 | 3/2010 | Qi et al. |
| 2010/0084616 A1 | 4/2010 | Brule et al. |
| 2010/0098877 A1 | 4/2010 | Cooper et al. |
| 2010/0112322 A1 | 5/2010 | Kumar et al. |
| 2010/0122980 A1 | 5/2010 | Wang et al. |
| 2010/0136327 A1 | 6/2010 | Ma et al. |
| 2010/0188833 A1 | 7/2010 | Liang et al. |
| 2010/0189883 A1* | 7/2010 | Pick .................. B82Y 30/00 427/109 |
| 2010/0239848 A1 | 9/2010 | Le Corvec |
| 2010/0259867 A1 | 10/2010 | Machida et al. |
| 2010/0270069 A1 | 10/2010 | Shar et al. |
| 2011/0073344 A1 | 3/2011 | Zhang et al. |
| 2011/0108545 A1 | 5/2011 | Wang et al. |
| 2011/0110843 A1 | 5/2011 | Pasquali et al. |
| 2011/0117316 A1 | 5/2011 | Lemaire |
| 2011/0124253 A1 | 5/2011 | Shah et al. |
| 2011/0171364 A1 | 7/2011 | Xing et al. |
| 2011/0180968 A1 | 7/2011 | Hu et al. |
| 2011/0240621 A1 | 10/2011 | Kessler et al. |
| 2012/0025165 A1 | 2/2012 | Armitage et al. |
| 2012/0138589 A1 | 6/2012 | Mitchell et al. |
| 2012/0145431 A1 | 6/2012 | Jeong et al. |
| 2012/0177926 A1 | 7/2012 | Mann et al. |
| 2012/0251432 A1 | 10/2012 | Cooper et al. |
| 2012/0282453 A1* | 11/2012 | Wang .................. B29C 70/62 428/299.1 |
| 2012/0301663 A1* | 11/2012 | Koike ................... B82Y 30/00 428/114 |
| 2013/0171352 A1 | 7/2013 | Xiong et al. |
| 2013/0222510 A1 | 8/2013 | Kim et al. |
| 2013/0316160 A1 | 11/2013 | Hata et al. |
| 2014/0011414 A1 | 1/2014 | Kruckenberg et al. |
| 2014/0021295 A1 | 1/2014 | Kruckenberg et al. |
| 2014/0069699 A1 | 3/2014 | Feng et al. |
| 2014/0080378 A1 | 3/2014 | Wasynczuk |
| 2014/0102743 A1 | 4/2014 | Doneker et al. |
| 2014/0131096 A1 | 5/2014 | Silverman et al. |
| 2014/0151111 A1 | 6/2014 | Shah et al. |
| 2014/0200731 A1 | 7/2014 | Evens et al. |
| 2014/0234552 A1 | 8/2014 | Frankenberger |
| 2014/0272183 A1 | 9/2014 | Cooper et al. |
| 2014/0314949 A1 | 10/2014 | Starkovich |
| 2015/0044383 A1 | 2/2015 | Kim et al. |
| 2016/0177511 A1 | 6/2016 | Horne et al. |
| 2016/0254072 A1 | 9/2016 | Park et al. |

FOREIGN PATENT DOCUMENTS

| | | |
|---|---|---|
| EP | 1962562 | 8/2008 |
| EP | 3178966 A1 | 6/2017 |
| EP | 3210765 A1 | 8/2017 |
| EP | 3235632 A1 | 10/2017 |
| JP | 3094482 U | 3/2003 |
| JP | 2004071424 | 3/2004 |
| JP | 2007234346 A | 9/2007 |
| JP | 2008535752 | 9/2008 |
| JP | 2011171264 A | 9/2011 |

(56) References Cited

FOREIGN PATENT DOCUMENTS

| | | |
|---|---|---|
| JP | 2012524966 A | 10/2012 |
| JP | 2012525476 A | 10/2012 |
| JP | 2012526724 A | 11/2012 |
| KR | 1020060083584 | 7/2006 |
| KR | 20100042760 A | 4/2010 |
| KR | 1020160082821 | 7/2016 |
| KR | 1020170141112 | 12/2017 |
| KR | 1020180103216 A | 9/2018 |
| WO | 2004080578 A1 | 9/2004 |
| WO | 2006008978 A1 | 1/2006 |
| WO | 2007149109 A2 | 12/2007 |
| WO | 2008085550 | 7/2008 |
| WO | 2009058855 A2 | 5/2009 |
| WO | 2010129234 | 11/2010 |
| WO | 2012092623 | 7/2012 |
| WO | 2013172762 A1 | 11/2013 |
| WO | 2016017765 | 2/2016 |
| WO | 2016019143 | 2/2016 |
| WO | 2016126827 | 8/2016 |
| WO | 2016205788 | 12/2016 |

OTHER PUBLICATIONS

European Extended Search Report dated Dec. 1, 2017 for corresponding International Application No. PCT/2015/042911, filed Jul. 30, 2015 (6 pages).
International Preliminary Report on Patentability Chapter I dated Aug. 8, 2017 for related International Application No. PCT/US2016/016380, filed Feb. 3, 2016 (10 pages).
International Preliminary Report on Patentability Chapter I dated Dec. 19, 2017 for related International Application No. PCT/US2016/038347, filed Jun. 20, 2016 (7 pages).
International Preliminary Report on Patentability Chapter I dated Aug. 7, 2018 for related International Application No. PCT/US2017/016657, filed Feb. 6, 2017 (6 pages).
Extended European Search Report dated Aug. 9, 2018 for corresponding European Application No. 16 747 183.7 filed Jul. 25, 2017 (9 pages).
International Search Report and Written Opinion of the International Searching Authority dated Oct. 22, 2015 for corresponding International Application No. PCT/US2015/042911, filed Jul. 30, 2015 (9 pages).
International Search Report and Written Opinion of the International Searching Authority dated Jul. 1, 2016, for related International Application No. PCT/US2016/016380, filed Feb. 3, 2016 (16 pages).
International Search Report and Written Opinion of the International Searching Authority dated Nov. 7, 2016, for related International Application No. PCT/US2016/038347, filed Jun. 20, 2016 (9 pages).
International Preliminary Report on Patentability dated Feb. 9, 2017 for corresponding International Application No. PCT/US2015/042911, filed Jul. 30, 2015 (7 pages).

International Search Report and Written Opinion of the International Searching Authority dated Jun. 8, 2017 for related International Application No. PCT/US2017/016657, filed Feb. 6, 2017 (8 pages).
Malik, et al., "Carbon Nanotube Sheet: Processing, Characterization and Applications", Nanotube Superfiber Materials, Chapter 13, Elsevier Inc., publisher, Waltham, MA, USA, 2014, p. 349-387 (39 pages).
Malik, et al., "Manufacturing and Applications of Carbon Nanotube Sheets", Recent Adv. in Circuits, Communications & Signal Processing, WSEAS Press, publisher, Cambridge, UK, Said, et al., Ed., 2013, p. 327-335 (9 pages).
International Search Report and Written Opinion dated May 23, 2019 for related International Application No. PCT/US2018/055364, filed Oct. 11, 2018 (20 pages).
First Office Action dated Jul. 23, 2019 for related Japanese Application No. 2017505238, filed Jan. 27, 2017 (5 pages) with JPO machine English translation (6 pages).
Extended European Search Report dated Mar. 26, 2019 in related European Application No. 18195539.4 filed Sep. 19, 2018 (4 pages).
Non-final Office Action dated Sep. 30, 2019 in related U.S. Appl. No. 15/007,379, filed Jan. 27, 2016 (9 pages).
First Office Action dated Dec. 17, 2019 in related Japanese Application No. 2017-559289 filed Aug. 2, 2017 (5 pages) with English machine translation from JPO (5 pages).
First Office Action dated Dec. 31, 2019 in related Chinese Application No. 201680008556.2 filed Aug. 3, 2017 (5 pages) with English translation (11 pages).
Extended European Search Report dated Mar. 9, 2020 in related European Application No. 17837732.1 filed Feb. 1, 2019 (11 pages).
Kim, et al., "Single-walled carbon nanotube/silicone rubber composites for compliant electrodes", Sep. 5, 2011, Carbon, vol. 50 pp. 444-449 (6 pages).
International Search Report and Written Opinion dated Jun. 25, 2020 for related International Application No. PCT/US2019/067148, filed Dec. 18, 2019 (18 pages).
Supplemental International Search Report and Written Opinion by the Japanese Patent Office (JPO), publicly available Jul. 2, 2020, for related International Application No. PCT/US2019/067148, filed Dec. 18, 2019 (17 pages).
Supplemental International Search Report and Written Opinion by the USPTO, publicly available Jul. 2, 2020, for related International Application No. PCT/US2019/067148, filed Dec. 18, 2019 (7 pages).
Supplemental International Search Report and Written Opinion by the Chinese Patent Office (CNIPA), publicly available Jul. 2, 2020, for related International Application No. PCT/US2019/067148, filed Dec. 18, 2019 (12 pages).
Supplemental International Search Report and Written Opinion by the Korean Patent Office (KIPO), publicly available Jul. 2, 2020, for related International Application No. PCT/US2019/067148, filed Dec. 18, 2019 (18 pages).
First Office Action dated Jul. 10, 2020 for copending U.S. Appl. No. 16/075,611, filed Aug. 4, 2018 (27 pages).

\* cited by examiner

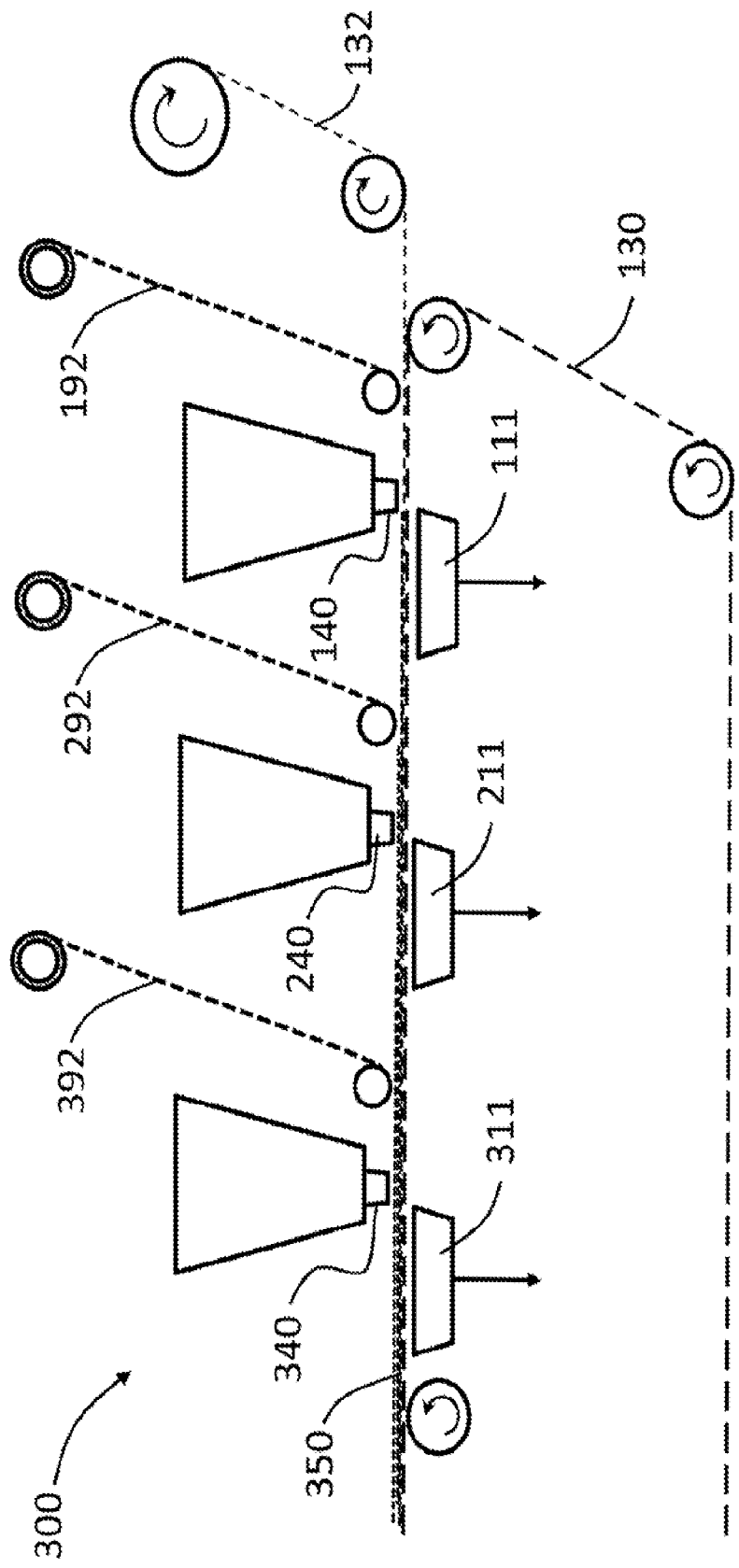

CARBON NANOTUBE SHEET STRUCTURE AND METHOD FOR ITS MAKING

BACKGROUND OF THE INVENTION

This invention relates generally to carbon nanotubes, and more particularly to methods for forming materials and structures from carbon nanotubes.

The exceptional mechanical properties of carbon nanotubes can be used in the development of nanotube-based, high performance structural and multifunctional nanostructural materials and devices. Carbon nanotubes have been made that are nanometers in diameter and several microns in length, and up to several millimeters in length. Strong interactions occur between nanotubes due to the van der Waals forces, which may require good tube dispersion, good tube contact, and high tube loading in materials and structures formed from carbon nanotubes.

Many applications, such as electrical conducting, thermal conducting and high performance nanocomposites, are made by pre-forming nanotubes into a network or membrane (5-200 μm in thickness) with controlled nanostructures (dispersion, alignment and loading). These membranes would also make nanotube materials and their properties capable of transfer into a macroscale material for easy handling. These preformed nanotube networks are also called buckypapers in the literature. Buckypapers are produced by a multiple-step process of dispersing nanotubes into a suspension and filtering the produced suspension. The produced buckypapers can be easily handled similar to conventional surface veil or glass materials. However, all the existing manufacturing techniques for nanotube membranes are discontinuous or batch processes and can only produce small quantities and very short membrane materials, which are serious barriers for future practical applications of nanotube membranes.

Current discontinuous or batch techniques can only produce nanotube membrane materials by filtering a nanotube suspension, and the dimensions are limited by the filter dimension. In these techniques, a well-dispersed nanotube suspension is first prepared by the aid of selected surfactant and sonication. Then, a filtration system with a filter membrane of 0.1 μm to 2 μm pore size is employed to filter the prepared suspension with the aid of vacuum or pressure. During the filtration, nanotubes deposit onto the surface of the filter membrane to form a nanotube network. After filtration, the produced nanotube film or buckypaper can be peeled off from the filter membrane. Producing large quantities of buckypapers requires frequent changing of the filters. Current processes use many filters to complete the filtration and limit manufacture of the buckypapers to piece by piece, which is time consuming, costly and also difficult to ensure consistent product quality. More importantly, due to the limitation of filter dimension, the product membranes are of a limited length (usually less than one foot).

U.S. Pat. No. 7,459,121, incorporated herein by reference in its entirety, describes a method for the continuous production of a network of nanotubes or other nanoscale fibers. The method comprises making a suspension of nanoscale fibers dispersed in a liquid medium, and filtering the suspension by moving a filter membrane through the suspension liquid, such that the nanoscale fibers are deposited directly on the filter membrane as the fluid medium flows through the filter membrane, thereby forming a continuous membrane of the nanoscale fibers. In one embodiment, the deposition of the nanoscale fibers occurs when and where the filter membrane moves into contact with a static, porous filter element. In another embodiment, the deposition of the nanoscale fibers occurs when and where the filter membrane moves into contact with a dynamic, porous filter element. For example, the filter element can be a rotary element which is mechanically driven to rotate and at least partially assist in moving the filter membrane across the filter element. The carbon nanotubes described therein are preferably single wall carbon nanotubes, and are described being commercially available from companies such as Carbon Nanotechnologies, Inc. (Houston, Tex., USA). Though the lengths of such carbon nanotubes are not described in the patent, the length of carbon nanotubes produced by Carbon Nanotechnologies, Inc. is understood to be in a range less than 0.01 mm (less than 50 microns). The apparatus described in U.S. Pat. No. 7,459,121 is not believed to be commercially available.

U.S. Pat. No. 7,955,535, incorporated herein by reference in its entirety, describes forming a suspension of small diameter SWCNTs and larger diameter MWCNTs (or CNFs) and filtering the suspension to remove the liquid.

U.S. Pat. No. 8,351,220, incorporated herein by reference in its entirety, describes a nanoscale fiber film comprising a buckypaper having an areal density (basis weight) of about 20-50 gsm, and a thickness of about 5 to 100 microns.

U.S. Pat. No. 5,254,399 describes a method for forming a nonwoven fabric having excellent sheet formation, that comprises fibers having a diameter of 7 μm or less and an aspect ratio (ratio of fiber length to fiber diameter, or L/D) in the range of $2000 < L/D \leq 6000$, and optionally thermal bonding fibers, and the fibers being three-dimensionally entangled, the disclosure of which is incorporated by reference in its entirety. The fibers can include organic synthetic fibers such as polyester fiber, polyolefin fiber, polyacrylonitrile fiber, polyvinyl alcohol fiber, nylon fiber, polyurethane fiber and the like, semi-synthetic fibers, regenerated fibers, natural fibers and the like.

Notwithstanding, there remains a need for a process that manufactures CNT sheets on an industrial and commercial scale in order to meet the emerging technological and market needs for such structures.

SUMMARY OF THE INVENTION

Methods and devices are provided herein for the continuous production of a network of carbon nanotubes (CNTs) into a continuous sheet structures.

The present invention includes a process for forming carbon nanotubes (CNT) structures that includes filtering a volume of a solution comprising a dispersion of CNTs, over a filter material to provide a filtered CNT structure having uniform dispersion of the CNTs over the filter material, and a step of drying the filtered CNT structure into a CNT sheet.

In another aspect of the invention, a method for forming a CNT structure or sheet includes making a dispersion or suspension of carbon nanotubes (CNTs) in a dispersing liquid, the dispersed CNTs having a median length of at least 50 microns and an aspect ratio of at least 2,500:1 as described herein; passing a volume of the CNT suspension over a filter material to provide a continuous pool or coating of the CNT suspension over the filter material, having a uniform depth (or thickness) sufficient to prevent puddling of the CNT suspension upon the surface of the filter material; drawing the dispersing liquid through the filter material to provide a uniform dispersion of the CNTs over the filter material and forming a CNT structure; drying any residual aqueous liquid from the CNT structure to form a CNT sheet over the filter material; and removing the CNT sheet from the filter material.

In another aspect of the invention, the step of drawing the dispersing liquid through the filter material comprises passing the CNT-laden filter material over a vacuum screen or box for a time sufficient to draw the dispersing liquid through the filter material and vacuum screen or box.

The present invention also includes an apparatus for manufacturing a continuous CNT sheet, and a continuous process for manufacturing continuous CNT sheets employing the apparatus. The continuous process comprising the steps of: i) moving a continuous conveying belt along a path that traverses a pooling region and a vacuum box; ii) applying a continuous porous carrier material to an upper side of the continuous conveying belt; iii) applying an aqueous suspension of carbon nanotubes (CNTs) dispersed in a liquid on the porous carrier material, the dispersed CNTs having a median length of at least 0.05 mm and an aspect ratio of at least 2,500:1; iv) forming a continuous pool of the aqueous suspension of the CNTs over and across the width of the continuous porous carrier material in the pooling region, the continuous pool of the aqueous suspension of the CNTs having a uniform thickness sufficient to prevent puddling upon the continuous porous carrier material; v) advancing the porous carrier material and the continuous pool of the aqueous suspension of the CNTs over the vacuum box; vi) drawing by vacuum the liquid of the aqueous suspension of the CNTs through the porous carrier material, and filtering a uniform dispersion of filtered CNTs over the porous carrier material to form a filtered CNT structure; vii) optionally drying any residual liquid from the filtered CNT structure to form a CNT sheet over the porous carrier material; and v) removing the CNT sheet from the continuous porous carrier material.

In an aspect of the invention, the continuous porous carrier material is a continuous porous film, sheet or fabric material. The continuous porous carrier material provides a stable and resilient porous structure for pulling the forming CNT structure through and along the apparatus, to prevent tearing and degradation of the CNT structure during manufacture. The continuous porous carrier material can include a woven or meshed synthetic polymer, which can include hydrophobic polymers, including but not limited to polytetrafluoroethylene (PTFE), also known as Teflon®, and hydrophilic polymers, including but not limited to aliphatic polyamides, also known as nylon. A metal-coated woven or a metallic mesh or screen material can also be used as a porous carrier material. In an embodiment, the porous carrier material, has a plurality of openings having a size between about 0.1 micron, and up to about 10 micron.

In another aspect of the invention, the continuous porous carrier material can also be a filter material that filters the dispersed CNTs from the liquid of the aqueous suspension of the CNTs. In this embodiment, the CNTs are filtered onto the continuous porous carrier material to form the CNT structure and CNT sheet, and the CNT sheet is then separated or peeled away from the continuous porous carrier material. In this embodiment, the CNT structure and CNT sheet will typically have a basis weight of CNTs sufficient to provide the CNT structure with integrity to be peeled away continuously from the carrier material as a free-standing CNT sheet, without tearing or degrading.

In a further aspect of the invention, a secondary layer can applied to an upper side of the continuous porous carrier material, before applying the CNT suspension. The secondary layer can be a continuous apertured or porous film, sheet or fabric material through which the liquid of the aqueous suspension of the CNTs is drawn. The secondary layer, also referred to as a veil layer, when used over a carrier material, provides a continuous composite CNT sheet that has improved separation or "peel away" from the continuous porous carrier material. The secondary or veil layer can be very thin and light weight (low basis weight) to provide the separation of the CNT structure from the carrier material, and can also improve or contribute the physical or function properties to the CNT structure and to the composite CNT sheet.

Thus, the present invention further includes a continuous process for manufacturing a continuous composite CNT sheet, comprising the steps of: i) moving a continuous conveying belt along a path that traverses a pooling region and a vacuum box; ii) applying a continuous porous carrier material to an upper side of the moving continuous conveying belt; iii) applying a continuous porous veil layer to an upper side of the continuous porous carrier material; iv) applying an aqueous suspension of carbon nanotubes (CNTs) dispersed in a liquid on the porous veil layer, the dispersed CNTs having a median length of at least 0.05 mm and an aspect ratio of at least 2,500:1; v) forming a continuous pool of the aqueous suspension of the CNTs over and across the width of the porous veil layer moving in the pooling region, the continuous pool of the aqueous suspension of the CNTs having a uniform thickness sufficient to prevent puddling upon the porous veil layer; vi) advancing the porous veil layer, porous carrier material, and the continuous pool of the aqueous suspension of the CNTs over the vacuum box; vii) drawing by vacuum the liquid of the aqueous suspension of the CNTs through the porous veil layer and the porous carrier material, and filtering a uniform dispersion of filtered CNTs over the porous veil layer to form a filtered CNT structure; viii) optionally drying any residual liquid from the filtered CNT structure to form a composite CNT sheet over the porous carrier material; and ix) removing the composite CNT sheet from the continuous porous carrier material.

In another aspect of the invention, the continuous porous carrier material can be removed from the process and replaced with a secondary or veil layer, referred also to as a carrier-veil layer, that can provide the function of the carrier material. The carrier-veil layer provides filtration of CNTs from the CNT suspension, and has a sufficiently stable and resilient porous structure sufficient for pulling the forming CNT structure through and along the apparatus during processing, to prevent tearing and degradation of the CNT structure during manufacture, while having physical and functional properties, for example, low basis weight and minimal thickness, that are consistent with the intended use of the CNT sheet. Optionally, in a post-manufacturing process, the CNT structure can be separated from the veil-carrier layer.

Thus, the present invention also includes a continuous process for manufacturing continuous CNT sheets, comprising the steps of: i) moving a continuous conveying belt along a path that traverses a pooling region and a vacuum box; ii) applying a continuous porous carrier-veil layer to an upper side of the continuous conveying belt; iii) applying an aqueous suspension of carbon nanotubes (CNTs) dispersed in a liquid on the porous carrier-veil layer, the dispersed CNTs having a median length of at least 0.05 mm and an aspect ratio of at least 2,500:1; iv) forming a continuous pool of the aqueous suspension of the CNTs over and across the width of the continuous porous carrier-veil layer in the pooling region, the continuous pool of the aqueous suspension of the CNTs having a uniform thickness sufficient to prevent puddling upon the continuous porous carrier-veil layer; v) advancing the continuous porous carrier-veil layer and the continuous pool of the aqueous suspension of the CNTs over the vacuum box; vi) drawing by vacuum the liquid of the aqueous suspension of the CNTs through the continuous porous carrier-veil layer, and filtering a uniform dispersion of filtered CNTs over the continuous porous carrier-veil layer to form a filtered CNT structure on the carrier-veil layer, vii) optionally drying any residual liquid from the filtered CNT structure to form a continuous composite CNT-veil sheet including the CNT structure and the carrier-veil layer; and viii) removing the continuous composite CNT-veil sheet from the continuous conveying belt.

The present invention also provides a manufactured CNT sheet comprising CNTs arranged in a randomly oriented, uniformly distributed pattern. The CNT sheet a basis weight of at least 1 gram CNT per square meter (gsm), and comprises CNTs having a median length of at least 0.05 mm (50 microns) and an aspect ratio (length/diameter, L/D) of at least 2,500:1. The manufactured CNT sheet has a relative density of about 1.5 or less (relative water).

The desired basis weight of the manufactured CNT structure can be at least 2 gsm, at least 3 gsm, at least 4 gsm, at least 5 gsm, and at least 6 gsm; and up to about 40 gsm, including up to about 30 gsm, up to about 20 gsm, up to about 15 gsm, up to about 12 gsm, up to about 10 gsm, up to about 8 gsm, and up to about 6 gsm; and can be about 3 gsm, about 4 gsm, about 5 gsm, about 6 gsm, about 7 gsm, about 8 gsm, about 9 gsm, about 10 gsm, and about 15 gsm.

The relative density of the manufactured CNT structure can be about 1.0 or less, and can be about 0.8 or less, about 0.7 or less, about 0.6 or less, about 0.5 or less, about 0.4 or less, and about 0.3 or less, such as 0.25. Such relative densities are well below those of buckypapers described in the art, and provide a CNT sheet with an effective thickness with a substantially lower basis weight.

The long CNTs can have a median length of at least 0.1 mm, or at least 0.2 mm, or at least 0.3 mm, a length of at least 0.4 mm, or at least 0.5 mm, and of at least 2 mm, and can be highly elongated CNTs having an aspect ratio of at least 5,000:1, including at least 10,000:1, at least 50,000:1, and at least 100,000:1. The long CNTs can include single wall CNTs (SWCNTs), double wall CNTs (DWCNTs), multi-wall CNTs (MWCNTs), and mixtures and combinations thereof.

The CNTs can also optionally include short CNTs that have a median length of less than about 50 microns, and/or an aspect ratio of less than 2,500:1.

The long CNTs can also be combined with short CNTs to provide additional functionality, typically in a weight ratio of long CNTs to short CNTs selected from the group consisting of at least 1:10, at least 1:3, at least 1:2, at least 1:1, at least 2:1, at least 10:1, and at least 99:1.

In a further aspect of the invention, the CNT sheet can have a free-standing structure.

In another aspect of the invention, the mass proportion of the CNTs in the CNT sheet that have a length of at least about 50 microns and the aspect ratio of at least 2,500:1, will comprise at least 75% of the total CNTs in the sheet or CNT structure, including at least 80%, at least 85%, at least 90%, at least 95%, at least 97%, at least 98%, and at least 99% of the total CNTs in the sheet or CNT structure.

The CNT structure or sheet includes a nonwoven sheet comprising carbon CNTs that form a continuous matrix or solid phase across the entire area of the nonwoven sheet. In this aspect, each CNT is in direct contact with a plurality of adjacent CNTs along its length.

In a further aspect of the invention, the CNTs can be chemically treated prior to sheet formation to modify the physical or functional properties of the CNTs, or of the nonwoven CNT sheet or structure made therefrom.

In another aspect of the invention, the CNTs can be pre-treated by immersion into an acidic solution, including an organic or inorganic acid, and having a solution pH of less than 1.0. A non-limiting example of an acid is nitric acid. Alternatively, or in addition, the CNT structure can be post-treated with an acid solution.

In yet another aspect of the invention, the aqueous liquid is drawn through the filter material with the aid of vacuum to pull water through the filter material, or with applied pressure to press water through the filter material, or a combination thereof.

An apparatus for manufacturing a continuous CNT sheet is based on a conventional apparatus for making wet-laid nonwoven structures, and includes a continuous conveying belt that moves along a path that traverses a table including a pooling region and a vacuum box, an optional drying unit, and various rollers and conveying elements for pulling the continuous conveying belt along the apparatus and through the process. The apparatus also includes the means for storing and supplying a suspension of CNTs to the pooling region, and a headbox or means for forming a continuous pool of the aqueous suspension of the CNTs across the width of a filter material disposed on the continuous conveying belt in the pooling region.

BRIEF DESCRIPTION OF THE FIGURES

FIG. 9 shows a schematic of a CNT web-laying machine that includes two or more headboxes for feeding additional and different suspensions of CNTs or other materials.

DETAILED DESCRIPTION OF THE INVENTION

As used herein, the terms "comprise," "comprising," "include," and "including" are intended to be open, non-limiting terms, unless the contrary is expressly indicated.

As used herein, a "free-standing" sheet or structure of CNTs is one that is capable of formation, or separation from a filter material, and handling or manipulation without falling apart, or without significant flaking or crumbling of CNTs away from the sheet or structure.

A "continuous" sheet of material is an elongated sheet having a length that is orders of magnitude greater than the width of the sheet, and a roll of the sheet material.

Conventional wet-laid nonwovens are made by a modified papermaking process. That is, the fibers to be used are suspended in water or other dispersive liquid. A specialized machine is used to separate the water or other dispersive liquid from the fibers to form a uniform sheet of material, which is then dried. The wet-laid process has its origins in the manufacture of paper and was developed because paper manufacturers wanted to be able to use uncut, long natural fibers and synthetic fibers in addition to the usual raw materials without changing the process. Nonwoven textile fibers tend to be longer, stronger, and relatively inert when compared to papermaking fibers.

Figure 1:
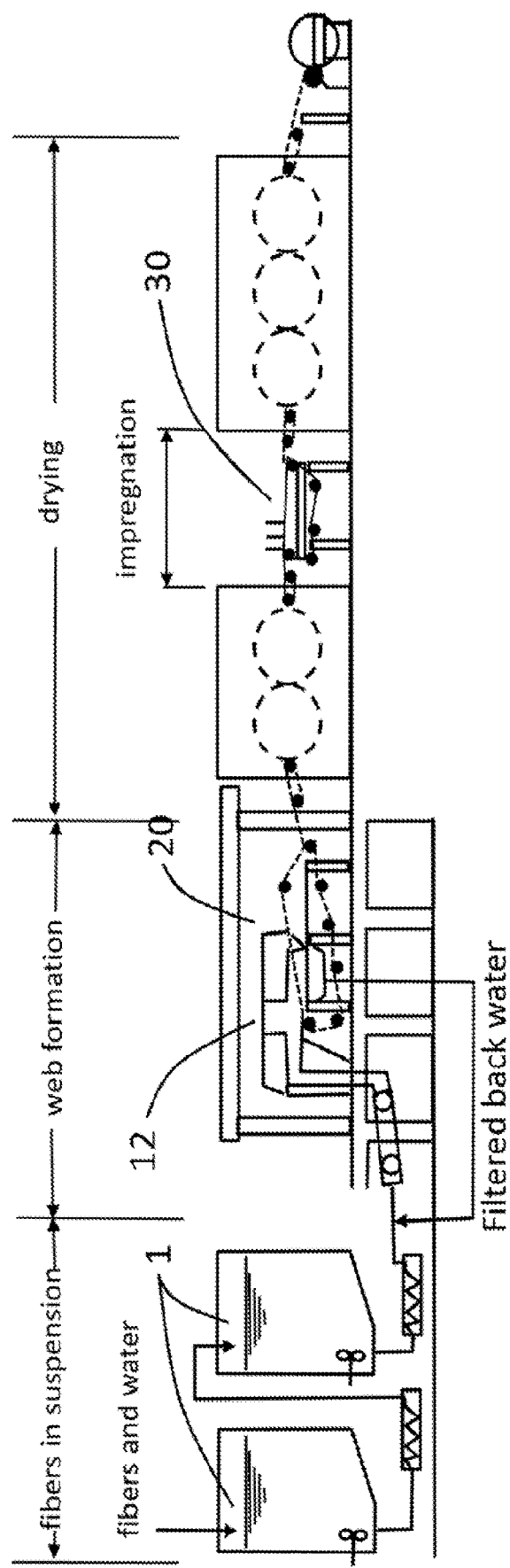
FIG. 1 shows a schematic of a conventional apparatus for making nonwoven wet-laid fabrics.

FIG. 1 shows a schematic of an apparatus for making nonwoven wet-laid fabrics. Three characteristic stages in the manufacture of nonwoven fabrics by the wet-laid method: 1) suspension of the fiber (1) in water or other dispersive liquid, and transport of the suspension onto a continuous traveling screen (12), 2) continuous web formation on the screen as a result of filtration (20), and 3) drying (30) of the web.

A process for forming CNT structures of the present invention is an improvement on the conventional process for making wet-laid nonwovens. A process for forming CNT structures includes a step or stage of forming a suspension of CNTs is a dispersive liquid, a filtering a volume of the CNT suspension to provide a uniform dispersion of a CNT structure over the filter material, and drying any residual dispersive liquid from the filtered CNT structure.

Making the Suspension

The first step in making a continuous length of CNT structure involves making a suspension of CNTs in a dispersive liquid, which can include water. The dispersive liquid can also include one or more compounds for improving and stabilizing the dispersion and suspension of the CNTs in the dispersive liquid, and one or more compounds that improve the functional properties of the CNT structure produced by the method.

While water is a preferred dispersive liquid, other non-solvating liquids can be used to disperse and process the CNTs. As used herein, the term "non-solvating" refers to compounds in liquid form that are non-reactive essentially with the CNTs and in which the CNTs are essentially insoluble. Examples of other suitable non-solvating liquids include volatile organic liquids, selected from the group consisting of acetone, ethanol, methanol, isopropanol, n-hexane, ether, acetonitrile, chloroform, DMF, and mixtures thereof. Low-boiling point solvents are typically preferred so that the solvent can be easily and quickly removed, facilitating drying of the resulting CNT structure.

The dispersive liquid can optionally include one or more surfactants (e.g., dispersant agents, anti-flocculants) to maintain the dispersing, wet-laid formation, or dewatering of the CNTs and wet-laid CNT structures. For example, BYK-9076 (from BYK Chem USA), Triton X-100, dodecylbenzenesulfonic acid sodium salt (NaDDBS), and SDS may be used.

The carbon nanotubes can be provided in a dry, bulk form. The CNTs can include long CNTs that typically have a median length selected from the group consisting of at least about 0.05 mm (50 microns), such as at least about 0.1 mm (100 microns), at least about 0.2 mm, at least about 0.3 mm, at least about 0.4 mm, at least about 0.5 mm, at least about 1 mm, at least about 2 mm, and at least about 5 mm. The CNTs can be single wall nanotubes (SWNT), double wall nanotubes (DWNT) or other multi-wall nanotubes (MWNT). Typical MWCNTs have a tube diameter of about 5 to 10 nanometers. Examples of CNTs useful in the present invention are those disclosed in or made by a process described in U.S. Pat. No. 8,753,602, the disclosure of which is incorporated by reference in its entirety. Such carbon nanotubes can include long, vertically-aligned CNTs, which are commercially available from General Nano LLC (Cincinnati, Ohio, USA).

U.S. Pat. No. 8,137,653, the disclosure of which is incorporated by reference in its entirety, discloses a method of producing carbon nanotubes, and substantially single wall CNTS, comprising, in a reaction chamber, evaporating a partially melted catalyst electrode by an electrical arc discharge, condensing the evaporated catalyst vapors to form nanoparticles comprising the catalyst, and decomposing gaseous hydrocarbons in the presence of the nanoparticles to form carbon nanotubes on the surface of the catalyst nanoparticles.

A CNT concentration in the aqueous liquid is at least 100 mg/L of suspension, and up to about 10 g/L, which facilitates dispersion and suspension, and minimizes agglomeration or flocculation of the CNTs in the dispersing liquid. In various embodiments of the invention, the CNT concentration is at least about 500 mg/L, and at least about 700 mg/L, and up to about 5 g/L, up to about 1 g/l, and up to about 500 mg/L. Further, the aqueous suspension can comprise a CNT level selected from the group consisting of about 1% CNTs by weight or less, about 0.5% CNTs by weight or less, about 0.1% CNTs by weight or less, about 0.07% CNTs by weight or less, about 0.05% CNTs by weight or less, and including at least about 0.01% CNTs by weight, such as at least about 0.05% CNTs by weight.

Generally, the CNTs are added to a quantity of the dispersive liquid under mixing conditions using one or more agitation or dispersing devices known in the art. The CNT suspension can be made in a batch process or in a continuous process. In one embodiment, the mixture of CNTs in the aqueous liquid is subjected to sonication using conventional sonication equipment. The suspension of CNTs in water can also be formed using high shear mixing, and microfluidic mixing techniques, described in U.S. Pat. No. 8,283,403, the disclosure of which is incorporated by reference in its entirety. A non-limiting example of a high shear mixing device for dispersing CNTs in an aqueous liquid is a power injection system, for either batch of in-line (continuous) mixing of CNT powder and the liquid, by injecting the powder into a high-shear rotor/stator mixer, available as SLIM technology from Charles Ross & Sons Company.

The Power Number, $N_p$, is commonly used as a dimensionless number for mixing. It is defined as:

$N_p = P/(\omega^3 D^5 \rho)$, where

P=power input of mixer,
$\omega$=rotational speed of mixer,
D=mixing blade diameter, and
$\rho$=dispersion density of liquid To compare mixing scale, we can analogize with the Kolmogorov scale of mixing, $\lambda$, to the average length of CNTs, L.

$\lambda = (\nu^3/\varepsilon)^{1/4}$, where $\nu$=kinematic viscosity of dispersion, and
$\varepsilon$=rate of dissipation of turbulence kinetic energy per unit mass.

For long CNTs, ν is much higher (more viscous); thus, λ is larger but scales to slightly less than linearly. But, it requires a lot of energy (to the 4$^{th}$ power) to get to the same post mixing length. Also, note that ε should be about linear with P, the power input of mixer.

Without being bound by any particular theory, it is believed that as a result of mixing and dispersing CNTS in the aqueous liquid, the individual CNTs can reduce in length and the structure twisted or bent, and bundles of individual CNTs can become entangled and tied. Typically, the length of CNTs that are provided into the mixing and dispersing process are longer than those of the resulting dispersed CNTs; for example, a median length selected from the group consisting of at least about 0.05 mm, and an aspect ratio of at least 2,500:1. The median length can be at least 0.1 mm, at least about 0.2 mm, at least about 0.3 mm, at least about 0.4 mm, at least about 0.5 mm, at least about 1 mm, at least about 2 mm, and at least about 5 mm. The median length of the CNTs can also comprise a range selected from the group consisting of between 1 mm and 2 mm, between 1 mm and 3 mm, and between 2 mm and 3 mm. The aspect ratio can be at least 5,000:1, at least 10,000:1, at least 50,000:1, and at least 100,000:1, The resulting suspension of CNTs in the aqueous liquid is stable for at least several days, and longer. The suspension of CNTs can be mixed and stirred prior to use in the sheet forming process in order to ensure homogeneity of the CNT dispersion.

In an aspect of the invention, the long CNTs can be used with the short CNTs in a weight ratio of long CNTs to short CNTs selected from the group consisting of at least 1:99, at least 1:10, at least 1:3, at least 1:2, at least 1:1, and at least 2:1. The combination of the long CNTs and the short CNTs can include a combination of the functional properties and features of each type of CNT, including synergistic functional properties and features.

The dispersive liquid can also optionally include one or more binder compounds for improve both the structural and functional properties of the CNTs. An example of a binder is polyvinyl acrylate (PVA). The use of a binder such as PVA can improve the structure and function of CNT nonwoven sheets comprising both the long CNTs and the short CNTs. The binder is also useful for improving adherence of the dispersed CNTs into a hydrophobic filter material, such as Teflon®. In a further aspect of the invention, the addition of the binder can result in a continuous phase of the binder, which reduces the contact points (or CNT to CNT junctions) within the CNT sheet. The binder coats or encapsulates the CNTs within the polymer or resin matrix, separating the adjacent CNTs in close proximity by a layer of the binder material. The binder results in at least a partial disruption of the continuous matrix of the CNT sheet.

In one example, CNTs, as described above, are acid treated in fuming nitric acid, and then dispersed mechanically into the dispersive liquid, for example, water (without any surfactant). After storage, the dispersion of CNTs in the solution persisted at least 5 calendar days. Two 55-gallon drums of the CNT suspension were discharged into a 200-gallon make-up tank, and low intensity agitation was applied prior to laying down of the suspension onto the sheet filter material. Within just 5 minutes, a 10-gsm nonwoven structure was formed with good dispersion and uniformity of the CNTs within the nonwoven structure. In comparison to a suspension of short CNTs, the dispersion and suspension stability of the long CNTs is surprisingly very long in time. Without being bound by any particular theory, it is believed that the relative ease of formation of the CNT suspension is heavily influenced by the aspect ratio of the CNTs (that is, the length of an individual tube or fiber, to its mean diameter). The long CNTs have a suspension stability that is at least an order of magnitude longer than shorter CNTs. The use of CNTs having the prescribed aspect ratio enabled the formation of nonwoven CNT sheets having a basis weight as low as 2 gsm. It has been determined that nonwovens made from wood pulp fibers having a significantly smaller aspect ratio (about 100:1) could not be formed on a continuous, wet-laid nonwoven apparatus at a basis weight at or below of 10 gsm.

The high aspect ratios of the CNTs also result in a CNT nonwoven having a critical entanglement density well in excess of 100, where the critical entanglement density is defined as the ratio of the average length of a CNT to the average length between the two adjacent intersections of the CNT with other CNTs.

Filtration and CNT Structure Formation

The second step in making the CNT structure comprises passing a volume of the CNT suspension over a filter material, and drawing the dispersive liquid of the CNT suspension through the filter material to provide a uniform dispersion of the CNTs over the filter material.

The filter material is a flexible, resilient sheet material having pores or openings that are sufficiently large to allow the dispersive liquid to be drawn through with a moderate amount of vacuum or pressure, though are sufficiently small to prevent the multitude of dispersed CNTs from passing through. The size of the openings (circular, square or any other shape) are typically about a size between about 0.1 micron, and up to about 10 micron, and the porosity (open area) is typically about 20% to about 80%, and selected from the group consisting of about 30%, about 40% or about 50%.

The loading (weight per area) of the dispersed CNTs in the aqueous liquid onto the surface of the filter material can be determined from the desired basis weight of the resulting CNT structure (in grams per square meter, or "gsm"), and the concentration of dispersed CNTs in the dispersive liquid. The solution comprising the dispersed CNTs is loaded over a mesh screen, and in a manufacturing process, a continuous belt or mesh screen. A continuous layer of filter material is registered with and passes along the outer surface of the mesh screen, and serves as a retaining filter for the CNTs. The filter material is preferably non-soluble in and non-absorbent of water or of the dispersive liquid, and can include both hydrophilic materials, including nylon, and hydrophobic materials, including Teflon®. Hydrophilic or hydrophobic coatings, as applicable, can also be applied to a base structure of the filter material. The filter material is also referred to herein as a scrim. The filter material can include a continuous web of material, ranging from 10 inches (25 cm), and up to 60 inches (152 cm) in width, and of continuous lineal length. The length can be a spool or roll of material, or a continuous loop of material, depending upon whether the resulting CNT nonwoven sheet is removed from the scrim continuously following drying at the same production site (mentioned herein after), or is processed remotely.

CNTs inherently are poorly dispersible in aqueous solutions, even after being treated to provide improved hydrophilicity. Even after dispersion, the CNTs, and particularly CNTs having a long aspect ratio, tend to flocculate or aggregate into bundles or larger clot-like lumps in the aqueous dispersion. The conditions of the continuous process therefore must inhibit or prevent puddling of the CNT suspension and manage and control the inherent tendency of dispersed CNTs to flocculate or agglomerate.

The loaded filter material is then passed over a vacuum zone or vacuum box, which draws the dispersing liquid away from the dispersed and entangled CNTs, and through the openings in the filter material. The mesh screen or belt is typically a stainless steel, and has a pattern of wire mesh sufficient to support the filter material in a plane as it passes over the vacuum zone (also called a vacuum box). The strength or magnitude of the vacuum (pressure) and the length of the vacuum zone (or dwell time) are sufficient to draw substantially all of the free dispersive solution from above the filter material, while also allowing the dispersed CNTs to settle onto the filter material, typically in a randomly-oriented, uniformly-distributed pattern upon the filter material. Uniformly distributed CNTs will appear as a uniform, black material surface across the entire width of the filter material. Typically the CNT sheet structure has a uniformity of not more than 10% coefficient of variance (COV), wherein COV is determined by a well-known, conventional method. In an aspect of the invention, the carbon nanotubes (CNTs) comprised in the nonwoven sheet form a continuous matrix or phase across the entire area of the nonwoven sheet, where the CNTs are in direct contact with one or more adjacent CNTs along their lengths. Selection of vacuum box dimensions of length and width, can be optimized as needed for different CNT lengths and CNT nonwoven sheet bases weights.

The desired basis weight of the resulting CNT structure is affected by several parameters, including process conditions, apparatus, and the materials used. Generally, the larger the basis weight required, the higher the required CNT concentration, and/or the larger the dispersed liquid loading, and/or the larger the vacuum zone area, and/or the higher the vacuum applied, and/or the slower the linear speed of the filter material over the vacuum zone. All of these parameters can be manipulated to achieve specific desired characteristics of the CNT nonwoven sheet, including its thickness and porosity.

CNT Nonwoven Sheets

The CNT nonwoven sheets made according to the present invention, when used alone or as part of a composite structure or laminate, can provide numerous mechanical and functional benefits and properties, including electrical properties. The CNT nonwoven sheets and composite laminates and structures thereof can be used for constructing long and continuous thermal and electrical paths using CNTs in large structures or devices. The CNT nonwoven sheets and composite laminates and structures thereof can be used in a very wide variety of products and technologies, including aerospace, communications and power wire and cable, wind energy apparatus, sporting goods, etc. The CNT nonwoven sheets and composite laminates and structures thereof are useful as light-weight multifunctional composite structures that have high strength and electrical conductivity. The CNT nonwoven sheets and composite laminates and structures thereof can be provided in roll stock of any desirable and commercially-useful width, which can integrate into most conventional product manufacturing systems.

Non-limiting examples of functional properties, and the modulation thereof, that can be provided by the CNT nonwoven sheets and composite laminates and structures thereof, are conductive composites, electromagnetic wave absorption, in-situ structural health monitoring, lightning strike prevention and dissipation, water filtration, electromagnetic interference (EMI) shielding, thermal interface pads, energy storage, supercapacitor, and heat dissipation.

The desired basis weight of the resulting CNT structure is at least 1 grams of the CNTs per square meter (gsm), which can include a CNT basis weight selected from the group consisting of at least 1 gsm, at least 2 gsm, at least 3 gsm, at least 4 gsm, at least 5 gsm and at least 6 gsm; and up to about 40 gsm, including up to about 30 gsm, up to about 20 gsm, up to about 15 gsm, up to about 12 gsm, up to about 10 gsm, up to about 8 gsm, and up to about 6 gsm; and can be about 3 gsm, about 4 gsm, about 5 gsm, about 6 gsm, about 7 gsm, about 8 gsm, about 9 gsm, about 10 gsm, and about 15 gsm.

CNT nonwoven substrates having very low basis weight, typically of about 4 gsm or less, are so thin that they cannot be separated themselves, independently, from the filter material (scrim) without falling apart. CNT nonwoven sheets having very low basis weight can be separated from the filter material using a tacky substrate that itself comprises a member of a composite structure.

The present invention also includes a secondary web material that is processed with the CNT suspension liquid. The secondary web material can include low basis weight fiberglass, melt-spun or wet-laid nonwovens made of thermoplastics, including polyester, and carbon fiber veils or webs. In one embodiment of the invention, the secondary web material can be the filter material onto which the CNT suspension is applied and through which the dispersive liquid is drawn to deposit the CNT nonwoven sheet. In another embodiment, the secondary web material can be disposed in registry upon the upper surface of the filter material to form a dual filter material. Typically, after drying of the CNT nonwoven sheet, the secondary web material is removed from the base filter material with the CNTs attached thereto. The use of a secondary web material is also advantageous with very low bases weight CNT nonwoven sheets, as described above.

Functionalizing of CNTs

Functional properties of a CNT nonwoven sheet can be affected by treatment of the CNTs of the CNT nonwoven sheet, prior to their dispersion and suspension, or after formation into a CNT nonwoven sheet. The treatment of the CNTs or of the CNT nonwoven sheet can include a chemical treatment or a mechanical treatment.

In one aspect of the invention, functional properties of a CNT nonwoven sheet can be affected by an acid treatment of the CNTs, prior to their dispersion and suspension, or by a post-formation acid treatment. The post-formation treatment can be performed either in a batch treatment process, or in a continuous (roll) process, by immersing the CNT nonwoven sheet into an acid bath or by application of an acid solution thereto, followed by rinsing with water to remove residual acid, and drying. An acid treatment is believed to improve CNT purity and quality, by reducing the level of amorphous carbon and other defects in the CNTs. Treatment of the bulk CNT powder with strong (nitric) acid can cause end-cap cutting, and the introduction of carboxyl groups to the CNT sidewall. The addition of carboxyl groups to the CNT sidewalls can also enhance dispersion of the CNTs in water or other polar solvent by increasing the hydrophilicity of the CNTs. The removal of amorphous carbon coatings on individual nanotubes increases the concentration of crosslink joints and higher bending modulus, which can create more conductive tunnels and connections. CNT end-cap cutting can improve electrical conductivity by improving electron mobility from the ends of the carbon nanotubes to adjacent carbon nanotubes (tunneling). Likewise, post-formation acid treatment can improve electrical conductivity and increase the structure's density.

The acid treatment of the CNTs enhances CNT interactions and charge-carrying and transport capabilities. Acid treatment of the CNTs can also enhance cross-linking with a polymer composite. Without being bound by any particular theory, it is believed that during acid oxidation, the carbon-carbon bonded network of the graphitic layers is broken, allowing the introduction of oxygen units in the form of carboxyl, phenolic and lactone groups, which have been extensively exploited for further chemical functionalization.

The pre-treatment of the CNTs can include immersing the CNTs into an acidic solution. The acid solution can be a concentrated or fuming solution. The acid can be selected from an organic acid or inorganic acid, and can include an acid that provides a solution pH of less than 1.0. Examples of an acid are nitric acid, sulfuric acid, and mixtures or combinations thereof. In an embodiment of the invention, the acid is a 3:1 (mass) ratio of nitric and sulfuric acid.

Alternatively or in addition to acid post-post treatment, the CNT powder or formed CNT nonwoven sheet can be functionalized with low pressure/atmospheric pressure plasma, as described in Nanotube Superfiber Materials, Chapter 13, Malik et al, (2014), the disclosure of which is incorporated by reference in its entirety. A Surfx Atomflo 400-D reactor employing oxygen and helium as the active and carrier gases, respectively, provides a suitable bench-scale device for plasma functionalizing CNTs and CNT non-woven sheet structures. An alternative plasma device can include a linear plasma head for continuous functionalization of CNT non-woven sheets, including non-woven roll stock. An atmospheric plasma device produces an oxygen plasma stream at low temperature, which minimizes or prevents damage to the CNTs and the CNT structures. In an example, a plasma is formed by feeding He at a constant flow rate of 30 L/min and the flow rate of $O_2$ (0.2-0.65 L/min) is adjusted as per the plasma power desired. Structural and chemical modifications induced by plasma treatments on the MWCNTs can be tailored to promote adhesion or to modify other mechanical or electrical properties. Additionally, plasma functionalization can be used to clean the surface of the CNT nonwoven structure, crosslink surface molecules, or even generate other polar groups on the surface to which additional functional groups can be attached. The extent to which the CNT nonwoven are affected by plasma functionalization can be characterized using Raman spectroscopy, XPS, FTIR spectroscopy and changes in hydrophobic character of the CNT material through contact angle testing.

Another example of a chemical treatment is the addition of a large molecule onto the CNT structure which reduces the CNT-to-CNT contacts along the length of the carbon nanotubes. An example of a large molecule is an epoxide. Epoxide functionalization has been shown to increase the electrical resistance of a non-woven sheet. Further increases in sheet resistance have been shown by adding surfactants to the epoxide functionalized CNT dispersion which act to further separate the distance between adjacent carbon nanotubes. A 20× increase in sheet resistance has been observed with this approach, increasing the sheet resistance from about 5 ohms per square ($\Omega/\square$) to about 100$\Omega/\square$ for a 10 gsm nonwoven.

Another example of a chemical treatment is the treatment of the CNTs with fluorine. The bulk CNT powder or CNT sheets or structures can be treated with fluorine gas. Fluorination can increase resistance of CNTs to the point of becoming electrical insulators. The process uses fluorine gas at temperatures above 250° C. to create C—F bonds on the sidewalls of each individual carbon nanotubes.

Conducting or resistive particles or fibers can also be added to the CNTs to enhance or suppress electrical conductivity. In a non-limiting example, the addition of fiberglass flock to a longer CNT dispersion increased the electrical resistance and mechanical properties of a sheet. For example, the electrical resistance of a 1.0 gsm CNT sheet (CNT basis only) is increased from about 50$\Omega/\square$ to about 60$\Omega/\square$, an increase of 20%, while increasing the composite overall basis weight to 26.0 gsm. Of note, graphene and carbon nanofibers are used as filler in the high sheet resistance blends (on polyester) to maintain high uniformity at such low basis weights (about 2 gsm).

The present invention also includes producing a low basis weight (2 gsm) nonwoven sheet using either of long CNTs or short CNTs, or both long CNTs and short CNTs, on the wet-laying nonwoven apparatus that can include modifications in the construction and operation as described herein.

Electrical conductivity within the nonwoven CNT sheet structure can be enhanced or suppressed by mechanical treatment and processing of the CNT sheet. First, and simply, the basis weight can be increased to decrease sheet resistance (increase conductivity, at the cost and result of additional sheet weight and thickness). Empirically, the sheet resistance was found to "bottom out" at about 0.2$\Omega/\square$ with increased basis weight for a pretreated CNT sheet.

Mechanical methods for increasing electrical conductance (decreased sheet resistance) of a layer or nonwoven sheet of CNT include a method resulting in improved alignment of CNTs within the sheet, and densification of the CNT layer within the sheet. In addition, an improved dispersion of CNTs in the aqueous dispersion provides more densely packed CNTs in the non-woven CNT sheet, and the denser CNT packing in the nonwoven sheet results in a more conductive sheet and different mechanical or physical properties. Another approach being investigated is oxidation of the CNT sidewall via microwave excitation. This approach is similar to acid treatment in that it allows for better dispersion, which results in a denser nonwoven.

Manufacturing Process for a Continuous Sheet of CNT Structure

Figure 2:
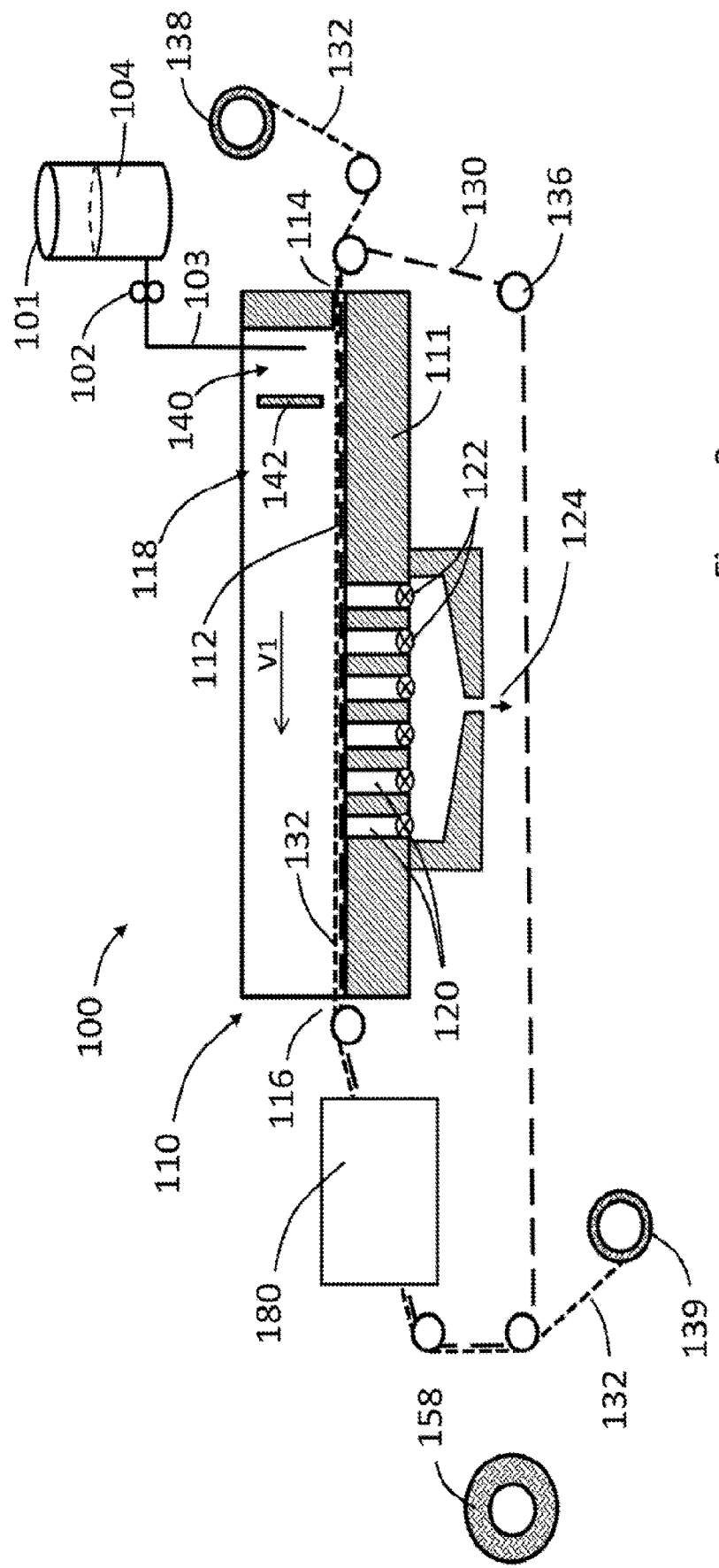
FIG. 2 shows apparatus that can be used in a process of the present invention for making CNT structures.
Figure 3:
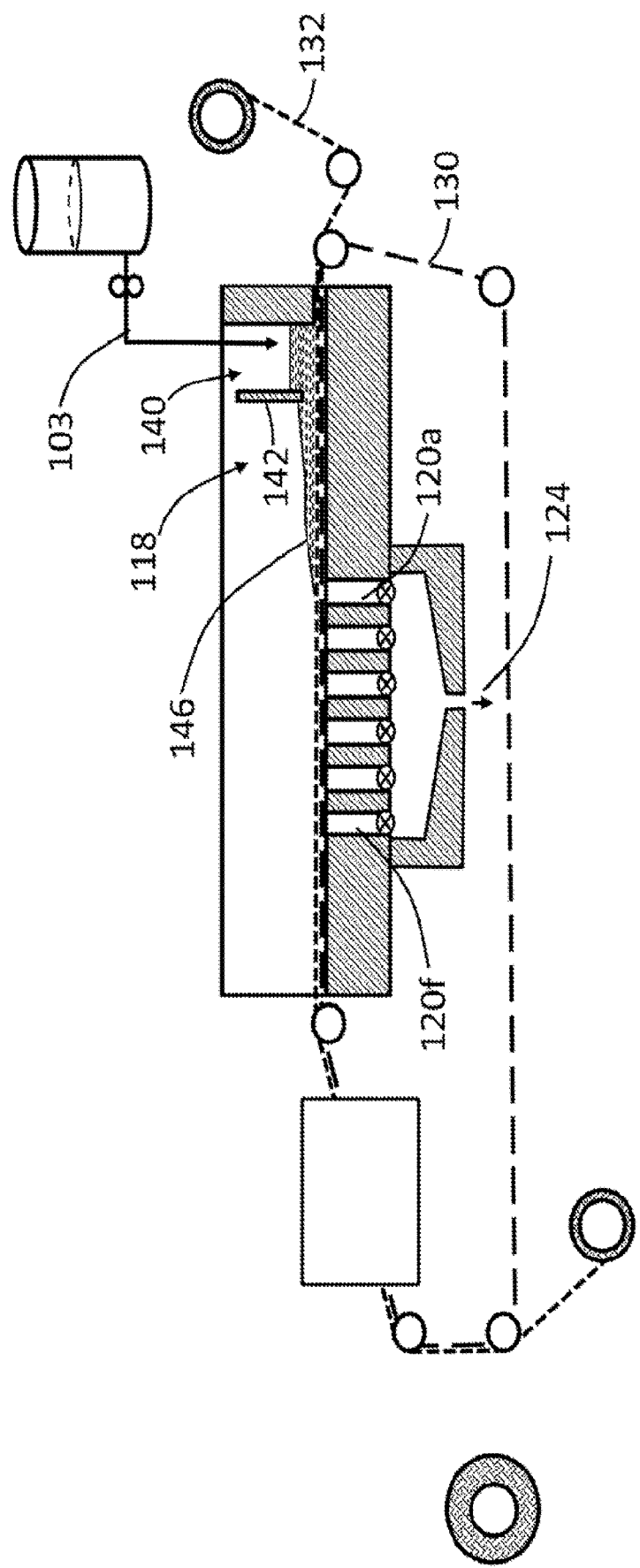
FIG. 3 shows the apparatus of FIG. 2 in which a solution of dispersed CNTs filling a reservoir and flowing in a flooding pool over a continuous filter material.
Figure 4:
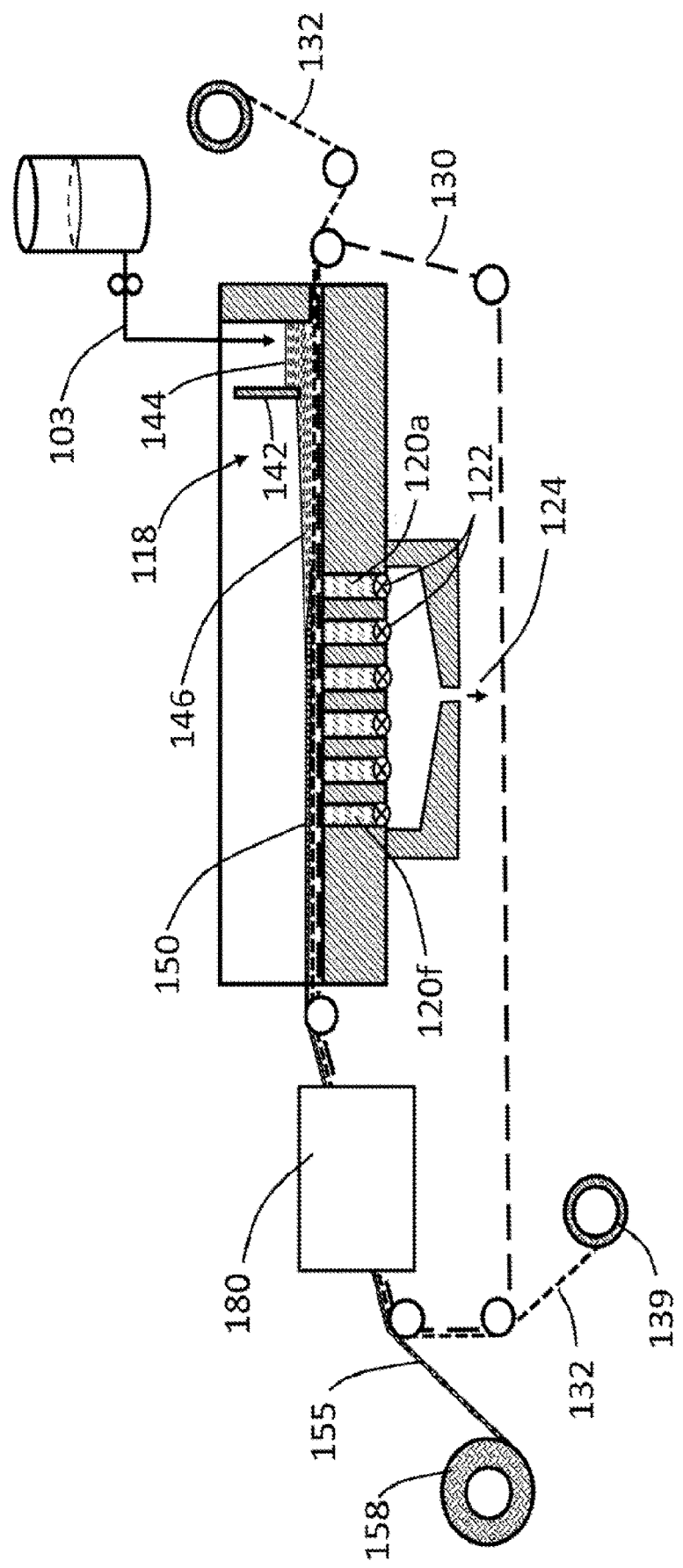
FIG. 4 shows the apparatus of FIG. 3 after the flooding pool of solution passes over a vacuum box to form the CNT sheet structure.

An apparatus 110 of the present invention useful in a manufacturing process 100 for forming CNT structures is shown in FIGS. 2-4. CNTs are dispersed by mixing in a water solution and are contained in a mixing/storage tank 101. The CNT suspension 104 contained in the mixing/storage tank 101 can be prepared remotely and transported to the facility for manufacturing the CNT structures, or can be prepared at the manufacturing site. The second step in making the CNT structure comprises passing a volume of the CNT suspension over a filter material, and drawing the dispersive liquid of the CNT suspension through the filter material to provide a uniform dispersion of the CNTs over the filter material. The CNT suspension 104 of CNTs in water is delivered by pump 102, or alternatively poured by gravity, at a controlled volumetric rate over a continuous porous belt 130, typically through a continuous sheet filter material or scrim 132.

A continuous porous belt 130 is typically a metallic, plastic-coated metallic, thermoplastic, or composite conveying belt, mesh or screen. The continuous porous belt 130 can have hinged sections or segments that provide industrial durability and reliable processing of the belt through the wet-laid apparatus 110, drier 180, and through the rollers 136, including for separation of the final CNT structure from the filter material, and its storage onto a product roller 192. The conventional construction of the porous belt 130 in a wet-laid nonwoven process apparatus provides very poor filtration of the nano-sized CNTs, which readily pour through the openings in the continuous belt 130, this indicating the need for a separate porous filter medium. The continuous porous belt 130 should have low extensibility or stretch in the machine direction for pulling the porous belt through the pathway of the apparatus. In general, the porous belt 130 should not be used as a filter medium for filtering CNTs from the CNT suspension, because the directly-deposited CNT structure may be difficult to separate from the porous belt, particularly in an industrial or commercial process.

The continuous porous belt 130 passes in a continuous loop or belt, carrying a filter medium, shown as a continuous porous carrier material 132, across and through the apparatus 110.

The continuous porous carrier material is a flexible, resilient sheet material having pores or openings that are sufficiently large to allow the dispersive liquid to be drawn through with a moderate amount of vacuum or pressure, though are sufficiently small to prevent the multitude of dispersed CNTs from passing through when the carrier material is also used as a filter material. The size of the openings (circular, square or any other shape) are typically about a size between about 0.1 micron, and up to about 10 micron, and the porosity (open area) is typically about 20% to about 80%, and selected from the group consisting of about 30%, about 40% or about 50%.

A continuous porous carrier material (generally referred to as a scrim) 132 provides a stable structure for pulling the forming CNT structure through and along the apparatus 110, to prevent tearing and degradation during manufacturing. The scrim is typically unrolled from a supply roller 138 and applied to the upper surface of the moving, continuous porous belt 130, and after removal of the CNT sheet product, is separated from the continuous porous belt 130 and re-rolled onto a reuse roller 139, which is then reused as a supply roller 138. Another function of the continuous porous carrier material 132 is to provide a more planar, smoother filtration surface, as compared to the continuous porous belt 130, which provides improved planar uniformity to the resulting CNT structure.

The continuous filter material 132 can provide the primary filtration of the CNT material from the dispersing liquid, and in this situation can be referred to as a filtering scrim. The filtering scrim 132 can comprise either a hydrophobic material or a hydrophilic material. A suitable hydrophobic material is a high porosity Teflon™ mesh. The hydrophobicity provides suitable and satisfactory release of the resulting CNT structure from the Teflon™ mesh scrim. A suitable hydrophilic material is a high porosity nylon mesh.

The apparatus 110 includes a table 111 having a planar top surface 112, along the length of which is drawn the continuous porous belt 130, from an inlet end 114 to outlet end 116. In a center portion of the planar top surface 112 of the apparatus 110 are a plurality of vacuum slots 120 formed in series along the length and extending transversely across the width of the top surface 112. The vacuum slots 120 are disposed for drawing the dispersing liquid away from the filtered CNTs under vacuum 124. The vacuum capacity through each of the plurality of vacuum slots 120 can be independently controlled 122 for improved deposition and pinning of the CNTs onto the continuous filter scrim 132, along the path traversing the vacuum box. The vacuum applied along the one or more vacuum slots 120 can be controlled independently. The typical vacuum is at least −1.0 psig, including in a range from about −2.5 psi to about −14 psi, and a typical vacuum gradient is about 2 psi to about 11 psig, along the length (machine direction) of the vacuum box, with a stranger vacuum applied at the leading-most vacuum slots, such as 120a. The plurality of slots 120 can closely spaced apart, a single enlarged vacuum opening can be used, to provide a substantially continuous vacuum area. Alternatively, the plurality of slots can be spaced apart with intermediate surfaces therebetween without a vacuum force upon the remaining flooding pool of CNT or the filtering CNT structure that passes over.

The physical length of the vacuum box of the present apparatus can be expected to be at least 5-10 times the length the vacuum box in a conventional wet-laid nonwoven process. The vacuum residence time under which the flooding pool of CNT solution is exposed to the vacuum filtration can be up to about 1 minute, including up to about 10 seconds, and up to about 1 second.

The manufacturing line speed of the apparatus and method of the present invention is at least about 1 foot per minute (fpm), including at least about 10 fpm, at least 50 fpm, and up to about 100 fpm and more.

The hydrophobicity and porosity of a filter scrim 132, for example, a Teflon™ mesh scrim material, can result in puddling of the solution of CNT suspension placed upon the advancing flat surface of the filter scrim 132. Puddling occurs when the solution of the aqueous CNT dispersion (a hydrophilic solution with dispersed CNTs) forms discontinuous and separated puddles on the hydrophobic filter scrim 132, typically due to their difference in interfacial surface tension. The application of any vacuum force on the underside of a filter scrim on which puddling of the solution of CNT suspension has occurred, results in the CNTs within the puddles forming into discontinuous patches of the filtered CNTs.

Another factor that can affect CNT filtration and the uniformity of the CNT structure is the dispersibility of the CNTs in an aqueous solution. CNTs inherently are poorly dispersible in aqueous solutions, even after being treated to provide improved hydrophilicity. Even after dispersion, the CNTs, and particularly CNTs having a long aspect ratio, tend to flocculate or aggregate into bundles or larger clot-like lumps in the aqueous dispersion. The conditions of the continuous process can be managed to inhibit or prevent puddling of the CNT suspension, and to control the inherent tendency of dispersed CNTs to flocculate or agglomerate.

In an embodiment of the invention, the apparatus 110 includes a reservoir or "headbox" 140 at the inlet end 114 that is bounded by the walls of the apparatus on three sides, and by a positionable sluice gate 142 on the downstream side that allows a portion of the CNT dispersion volume 144 within the reservoir 140 to flow under the bottom edge of sluice gate 142. The spacing under the sluice gate 142 is sufficient to pass thereunder the continuous porous belt 130 with the filter scrim 132, and to permit a controlled amount and depth of the CNT suspension to flow out of the reservoir. Downstream 118 from the sluice gate 142 is a flooded pool 146 of the CNT suspension that flows in the direction of movement of the scrim 132. The velocity v2 of the mass of the flooded pool 146 in the pooling area 118, flowing toward the vacuum slots 120, is two or more times, and up to 5 times, and up to 10 times, the linear velocity of the moving scrim 132. The depth of the flooded pool 146 across the width of the apparatus 110 is uniform and sufficient to spread and cover the entire surface of the filter scrim 132, to prevent puddling of the solution before arriving at the vacuum slots 120.

As the advancing flooded pool 146 above the scrim 132 arrives at the first of the vacuum slots 120a, the liquid within the CNT dispersion is strongly drawn through the filter scrim 132, which pins and sets a first portion or layer of the CNTs upon the filter scrim 132 (FIG. 3). As the flooded pool 146 above the filter scrim 132 advances and arrives at the second and subsequent vacuum slots 120, addition portions of layers of CNTs are pinned to and deposited upon the upper surface of the filter scrim 132. Without being bound by any particular theory, it is believed that providing a uniform layer of filtered CNTs onto the upper surface of the filter scrim 132 (or porous filter material, as well as any secondary veil-filter layer, described hereinafter) modifies the interfacial surface of the filter scrim 132 and improves the wetting of its surface by the CNT suspension, thereby minimizing and eliminating puddling upon the effected surface of the filter scrim.

As the advancing flooded pool 146 advances further with the filter scrim 132, its velocity v2 slows as more of the liquid is drawn through the filter scrim 132 by the successive vacuum slots 20. This also increases the density and thickness of the CNTs above and along the filter scrim 132. The slowing of the velocity of the flooded pool 146 permits any flocculated bundles or lumps of the CNTs in the upstream flooded pool 146 to "pack in" behind the depositing CNT structure, thus improving uniformity and reducing the variability in the density and thickness of the CNTs. Eventually, the forward edge of the flooded pool 146 "dries up" when a sufficient amount of the dispersing liquid has been drawn through, depositing all of the CNTs onto the filter scrim 132. Substantially all of the liquid from the CNT dispersion is drawn through the filter scrim 132 as the CNT structure 150 exits the last vacuum slot 120f.

After drawing away most of the water or other dispersive liquid, the advancing continuous CNT structure 150 is dried to a CNT sheet using a convection, contact and radiation dryer 180 (FIG. 4). The dried, continuous CNT sheet 155 is separated from the filter scrim 132 and taken up on a product roller 158. The separated scrim 132 is taken up on a reuse roller 139 for reuse in the process as scrim 132.

Figure 7:
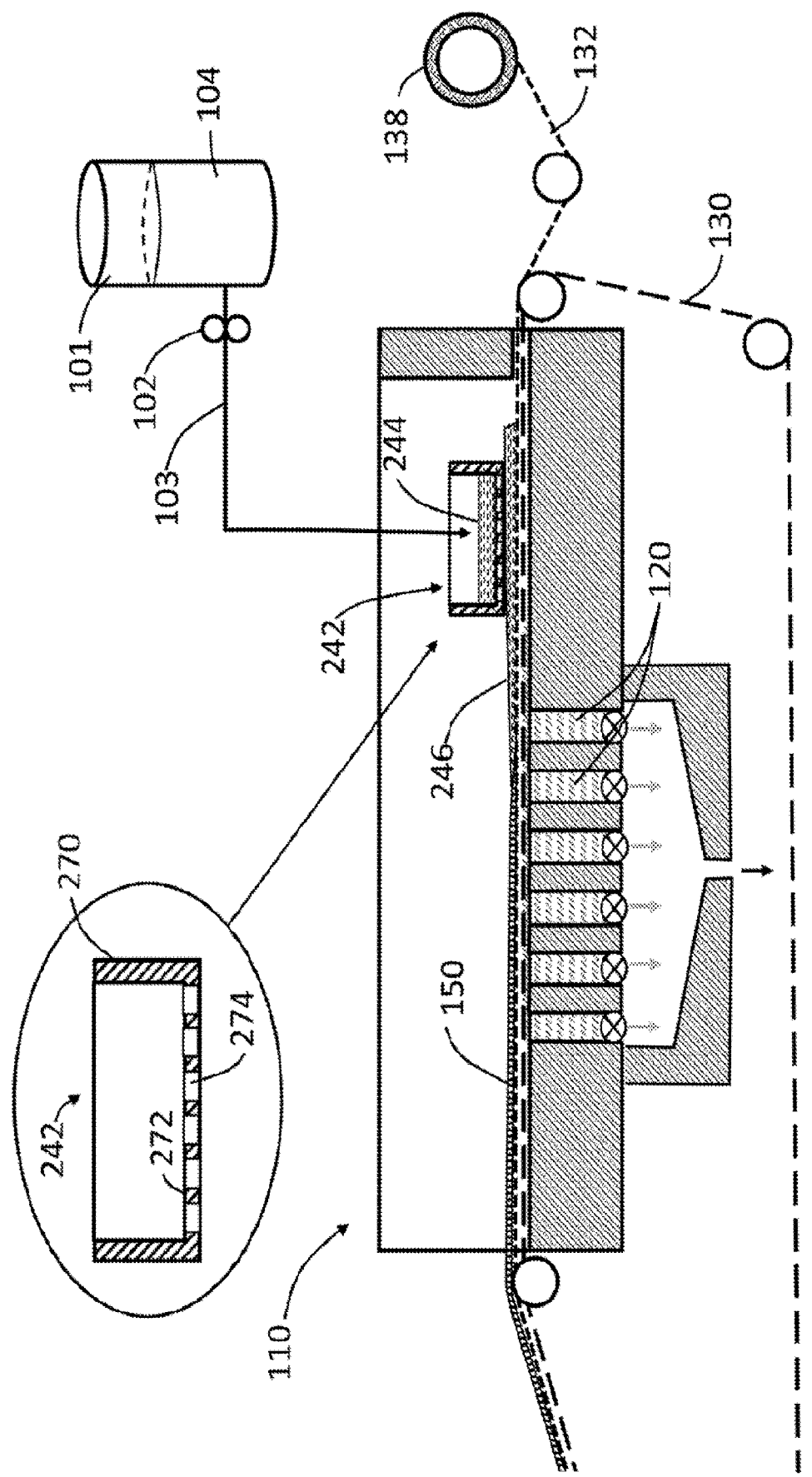
FIG. 7 shows an alternative apparatus for forming the flooding pool of the solution of dispersed CNTs over the continuous filter material.
Figure 8:
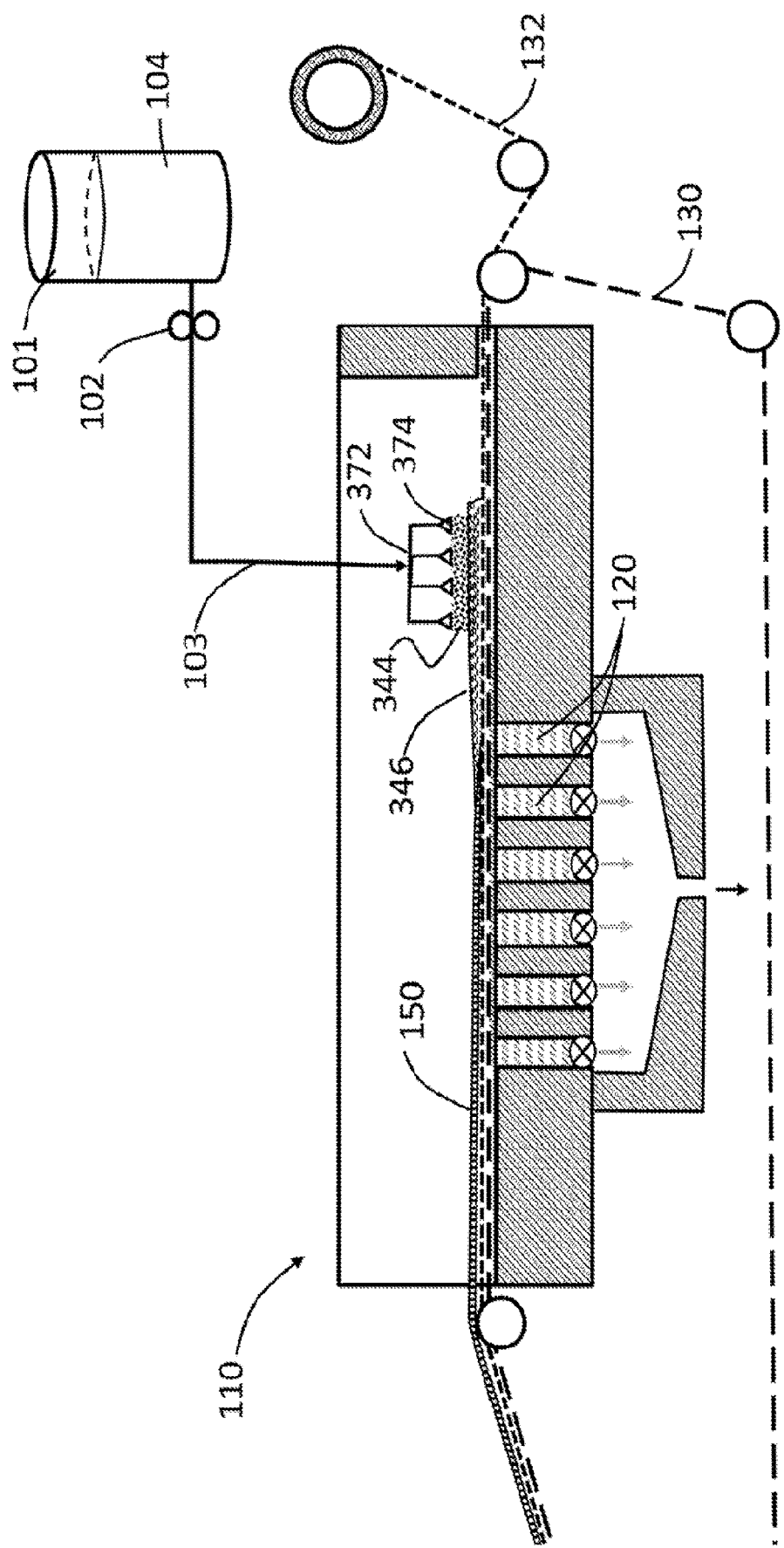
FIG. 8 shows another alternative apparatus using liquid spray nozzles to form the flooding pool of the solution of dispersed CNTs over the continuous filter material.

FIGS. 7 and 8 show alternative apparatus and methods for providing a controlled amount and depth of the CNT suspension in a flooded pool 146 that flows over and in the direction of movement of the filter scrim 132. FIG. 7 shows a container 242 including walls sufficient to contain a depth of CNT suspension 244, and a base 272 having apertures 274. The container 242 extends across the width of the filter scrim 132 to distribute the CNT solution flowing through the apertures 274 within the pooling area 118. The apertures 274 are sized in area and provided in number to maintain a depth of the flooded pool 146 sufficient to prevent puddling of the CNT suspension upon the surface of the filter scrim 132. FIG. 8 shows a spray distribution device 342 including a manifold 373 and a plurality of spray nozzles 374. The plurality of nozzles 374 extend across the width of the filter scrim 132 to distribute the CNT solution flowing through the nozzles 374 within the pooling area 118. The nozzle size, number and distribution likewise maintains a depth of the flooded pool 146 sufficient to prevent puddling of the CNT suspension upon the surface of the filter scrim 132.

Figure 5:
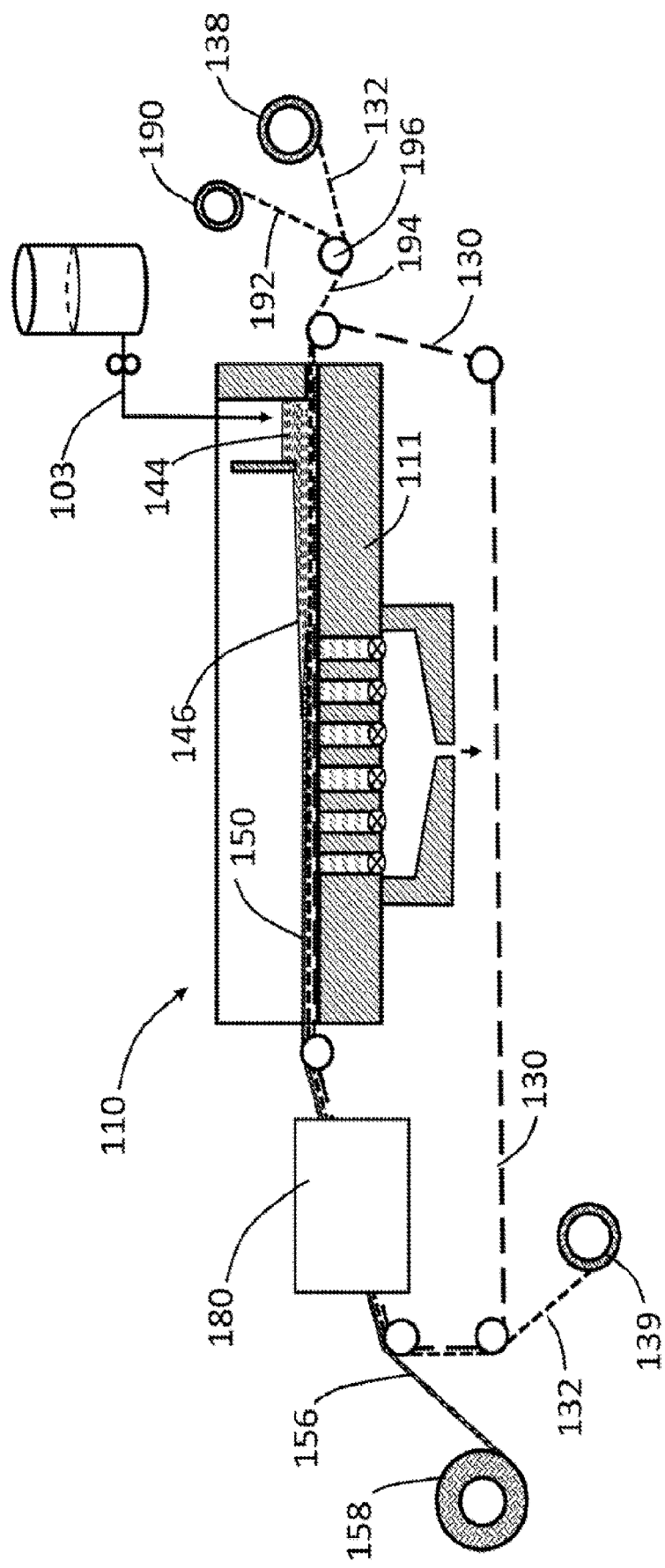
FIG. 5 shows the apparatus and an alternative process of FIG. 3, further applying a continuous porous veil layer over the continuous filter material.

FIG. 5 shows the apparatus 110 in a similar manufacturing process for forming CNT structures wherein a secondary veil layer 192 is unrolled from a veil supply roller 190 and applied continuously onto the moving upper surface of the scrim 132 at roller 196 to form a veil-carrier laminate 194. The veil-carrier laminate 194 is then continuously applied onto the belt 130 are previously described, and passed through and along the table, headbox(es) and vacuum slots apparatus 110. The CNT suspension is applied, flooded across, and filtered through the veil-carrier laminate 194, substantially as described above, to form a continuous CNT structure 150 on the veil-carrier laminate 194. In this embodiment, the veil layer 192 can be the primary filter medium, with the CNTs filtered directly onto the upper surface and elements of the veil layer, or the scrim (filter scrim) can be the primary filter medium, where an initial layer of CNTs can pass through the veil layer material and pinned and filtered on the filter scrim 132, and the remaining filtered CNTs layering on and above the upper surface of the veil layer; or a combination thereof. After forming and drying the continuous CNT structure 150, a composite layer 156 of the CNT structure 150 and the veil layer 192 can be separated from the carrier material 132, and stored on a product roller 158. The carrier material 132 is taken up on a reuse roller 139 for reuse in the process as scrim 132.

Figure 6:
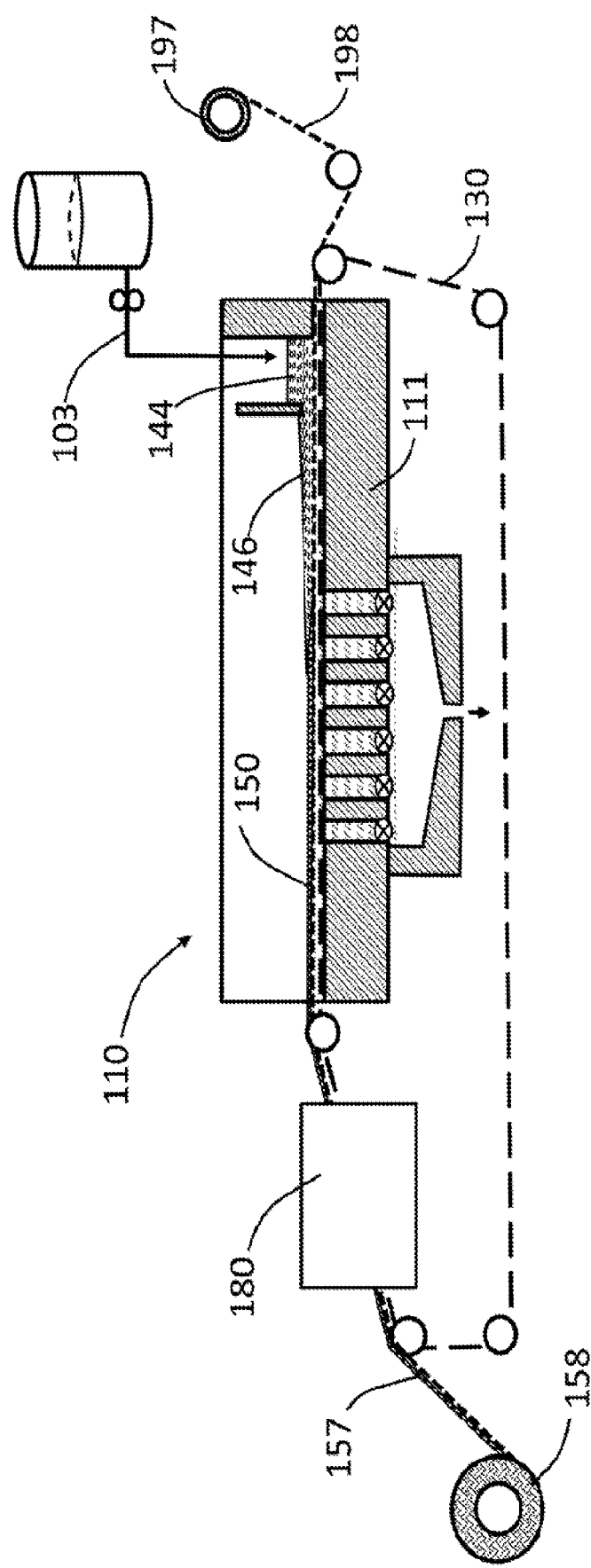
FIG. 6 shows the apparatus and another alternative process of FIG. 3, wherein the continuous filter material forms a continuous composite CNT-filter material sheet.

FIG. 6 shows the apparatus 110 in a further similar manufacturing process for forming CNT structures wherein a continuous porous carrier-veil layer 198 is unrolled from a carrier-veil supply roller 197 and applied continuously onto the moving upper side of the continuous conveying belt 130, The carrier-veil layer 198 is then passed through and along the table, headbox(es) and vacuum slots apparatus 110. The CNT suspension is applied, flooded across, and filtered through the carrier-veil layer 198, substantially as described above, to form a continuous CNT structure 150 onto the carrier-veil layer 198. In this embodiment, the carrier-veil layer 198 is the primary filter medium for the CNT suspension. After forming and drying the continuous CNT structure 150, a composite unitary layer 157 of the CNT structure 150 and the carrier-veil layer 198 can be separated from the belt 130, and stored on a product roller 158.

The resulting CNT sheet made with the above manufacturing processes can have a low density and low basis weight CNT structure with the uniformity and integrity for a wide variety of technology and industrial uses. The process also provides the flexibility to form effective CNT sheets from either SWCNTs or MWCNTs, or a combination thereof: For example, using a SWCNT having a median length above 50 microns and an aspect ratio greater than 5,000, a CNT sheet having a thickness of 40 microns and a relative density of 0.5 provides a basis weight of about 20 gsm, while a MWCNT having a median length above 100 microns and an aspect ratio greater than 5,000 forms CNT sheet having a thickness of 40 microns and a relative density of 0.25, with a basis weight of about 10 gsm, The desired basis weight of the manufactured CNT structure can be at least 2 gsm, at least 3 gsm, at least 4 gsm, at least 5 gsm, and at least 6 gsm; and up to about 40 gsm, including up to about 30 gsm, up to about 20 gsm, up to about 15 gam, up to about 12 gsm, up to about 10 gsm, up to about 8 gsm, and up to about 6 gsm; and can be about 3 gsm, about 4 gsm, about 5 gsm, about 6 gsm, about 7 gsm, about 8 gsm, about 9 gsm, about 10 gsm, and about 15 gsm.

The relative density of the manufactured CNT structure can be about 1.0 or less, and can be about 0.8 or less, about 0.7 or less, about 0.6 or less, about 0.5 or less, about 0.4 or less, and about 0.3 or less, such as 0.25. Such relative densities are well below those of buckypapers described in the art, and provide a CNT sheet with good uniformity and structural stability, an acceptable thickness, and a substantially lower basis weight.

Wet-laid CNT sheet can also employ bonding agents, including water-based crosslinkable synthetic polymer to provide flexibility and strength.

A secondary layer as described above can be used to support to the CNT structure, forming a composite sheet product to improve the mechanical properties and handling (processability) of the CNT sheet. The secondary layer, also referred to herein as a veil layer in the composite sheet, is typically a fabric or non-woven fabric, and is typically porous and flexible. In an embodiment of the invention, the veil layer is non-stretchable or non-extensive, to limit or present stretching of the composite sheet product. The veil layer can be processed with the CNTs in the wet-laid process, through and onto which the CNTs and any blended adjunct components can be vacuum formed, or can be post-laminated or made co-extensive with the formed CNT sheets. Examples of a suitable veil layer can include carbon fiber veil, polyester veil, or PEEK (polyether ether ketone) veil.

In another embodiment of the invention, a wet-laying nonwoven apparatus can include a plurality of headboxes for depositing a second dispersed CNT solution of suspended CNTs, fibers or other materials over the mesh screen. FIG. 9 shows a schematic of the wet-laying nonwoven apparatus 300 that includes two or more reservoirs or head boxes (illustrated as head boxes 140, 240, and 340), and a corresponding two or more tables with vacuum boxes (illustrated as tables 111, 211, and 311), arranged in series along the length of the continuous belt 130. The suspended CNTs, fibers or materials of the second dispersed CNT solution can include a second quantity or type of CNT(s), having the same or different physical properties, or having the same or different functional properties, from the CNTs of the first aqueous solution. The CNT, suspended fibers or materials of the second aqueous solution can include other nano-sized or micron-sized fibers or materials. The resulting CNT sheet 350 is dried and taken up on product roller as earlier described. FIG. 9 also shows that a secondary veil layer 192 can be provided before the first headbox 140. Similarly, and optionally, a second veil layer 292 can be provided before the second headbox 240 to provide a laminate of the first 192 and second veil 192 layers with the CNTs structures from the first headbox 140 therebetween, and the CNTs structures from the second headbox 240 thereon; and a third veil layer 392 can be provided before the third headbox 240 to provide a laminate of the first 192, second 292 and third 392 veil layers with the CNTs structures from the first headbox 140 and the second headbox 240 therebetween, and the CNTs structures from the third headbox 340 thereon. Optionally a fourth veil layer (not shown) can be applied on the resulting CNT sheet 350.

In an example embodiment, a first headbox 140 deposits a dispersed CNT solution comprising long CNTs, to form a base layer of long CNTs on the scrim. A second headbox 240, downstream of the first headbox 140, deposits a second dispersed CNT solution comprising short CNTs, which are distributed and filtered (211) as a second layer of short CNTs over the base layer of long CNTs. A third headbox 340 deposits a third dispersed CNT solution comprising long CNTs, which are distributed and filtered as a top layer of long CNTs over the second or intermediate layer of short CNTs.

In a second embodiment, a first headbox 140 deposits a dispersed CNT solution comprising long CNTs, to form a base layer of long CNTs on the scrim. A second headbox, downstream of the first headbox, deposits a second dispersed CNT solution comprising short CNTs, which are distributed and filtered (211) as a second layer of short CNTs over the base layer of long CNTs. A third headbox 340 deposits a third dispersed CNT solution comprising thermoplastic fibers, which are distributed and filtered (311) as a top layer of thermoplastic fibers over the second or intermediate layer of short CNTs.

In other embodiments, any combination of A) long CNTs, B) short CNTs, and C) other or thermoplastic fibers, can be prepared in nonwoven layers, ordered in any one of a wide variety, such as: ABA, ABB, ABC, ABC, CBA, CBC, ACA, etc.

In another embodiment of the invention, the second headbox can comprise a treatment solution which can be applied over the filtered nonwoven structure formed from the first headbox. A non-limiting example can include an acidic solution which is passed through the CNT non-woven structure, and maintained for a period of time sufficient to effect a change in the functional properties of the CNTs. An option third headbox can comprises a rinsing solution to remove the residual treatment (acid) solution following the (acid) treatment.

The second headbox, and subsequent headboxes, can be positioned downstream from the first vacuum box by a distance sufficient to ensure effective web formation, and to prevent any deconstruction of the first deposited layer of CNTs, or other fiber or material, deposited by the first (or previous) headbox, within the second (or subsequent) headbox.

In an alternative embodiment, the two or more headboxes can be arranged side-by-side, in parallel, over the mesh screen, with corresponding vacuum boxes, in order to deposit different nonwoven materials onto separate lateral zones of the filter material. Second and subsequent downstream headboxes can also be provided.

In an example, a wet-laying nonwoven apparatus has three headboxes and three vacuum boxes, for wet laying in series of three liquid suspensions of fibers. As a non-limiting example, the first and third suspensions are an aqueous solution of acid-treated long CNTs. The second suspension is an aqueous solution of short CNTs. The resulting nonwoven CNT includes a layer of short CNTs sandwiched between two layers of long CNTs.

We claim:

1. A process for manufacturing a carbon nanotube (CNT) sheet, comprising the steps of:
   i) moving a continuous conveying belt along a path that traverses a pooling region and a vacuum box;
   ii) applying a continuous porous carrier material to an upper side of the continuous conveying belt;
   iii) applying an aqueous suspension of carbon nanotubes (CNTs) dispersed in a liquid on the porous carrier material, the dispersed CNTs having a median length of at least 0.05 mm and an aspect ratio of at least 2,500:1;
   iv) forming a continuous pool of the aqueous suspension of the CNTs over and across the width of the continuous porous carrier material in the pooling region, the continuous pool of the aqueous suspension of the CNTs having a uniform depth sufficient to prevent puddling upon the continuous porous carrier material;
   v) advancing the porous carrier material and the continuous pool of the aqueous suspension of the CNTs over the vacuum box;
   vi) drawing by vacuum the liquid of the aqueous suspension of the CNTs through the porous carrier material, and filtering to provide a uniform dispersion of filtered CNTs over the porous carrier material to form a filtered CNT structure comprising uniformly-distributed, randomly-oriented CNTs;
   vii) drying any residual liquid from the filtered CNT structure to form a CNT sheet over the porous carrier material, the CNT sheet having a continuous phase of randomly-oriented, uniformly-distributed CNTs; and viii) removing the CNT sheet from the porous carrier material.

2. A continuous process for manufacturing a continuous composite CNT sheet, comprising the steps of:
   i) moving a continuous conveying belt along a path that traverses a pooling region and a vacuum box;
   ii) applying a continuous porous carrier material to an upper side of the moving continuous conveying belt;
   iii) applying a continuous porous veil layer to an upper side of the continuous porous carrier material;
   iv) applying an aqueous suspension of carbon nanotubes (CNTs) dispersed in a liquid on the porous veil layer, the dispersed CNTs having a median length of at least 0.05 mm and an aspect ratio of at least 2,500:1;
   v) forming a continuous pool of the aqueous suspension of the CNTs over and across the width of the porous veil layer moving in the pooling region, the continuous pool of the aqueous suspension of the CNTs having a uniform depth sufficient to prevent puddling upon the porous veil layer;
   vi) advancing the porous veil layer, the porous carrier material, and the continuous pool of the aqueous suspension of the CNTs over the vacuum box;
   vii) drawing by vacuum the liquid of the aqueous suspension of the CNTs through the porous veil layer and the porous carrier material, filtering to provide a uniform dispersion of filtered CNTs over the porous veil layer, and forming on the porous veil layer a filtered CNT structure comprising uniformly-distributed, randomly-oriented CNTs;
   viii) drying any residual liquid from the filtered CNT structure to form a composite CNT sheet comprising a continuous phase of randomly-oriented, uniformly-distributed CNTs on the porous veil layer, over the continuous porous carrier material; and
   ix) removing the composite CNT sheet from the continuous porous carrier material.

3. A continuous process for manufacturing continuous CNT sheets, comprising the steps of:
   i) moving a continuous conveying belt along a path that traverses a pooling region and a vacuum box;
   ii) applying a continuous porous carrier-veil layer to an upper side of the continuous conveying belt;
   iii) applying an aqueous suspension of carbon nanotubes (CNTs) dispersed in a liquid on the porous carrier-veil layer, the dispersed CNTs having a median length of at least 0.05 mm and an aspect ratio of at least 2,500:1;
   iv) forming a continuous pool of the aqueous suspension of the CNTs over and across the width of the continuous porous carrier-veil layer in the pooling region, the continuous pool of the aqueous suspension of the CNTs having a uniform depth sufficient to prevent puddling upon the continuous porous carrier-veil layer;
   v) advancing the continuous porous carrier-veil layer and the continuous pool of the aqueous suspension of the CNTs over the vacuum box;
   vi) drawing by vacuum the liquid of the aqueous suspension of the CNTs through the continuous porous carrier-veil layer, and filtering to provide a uniform dispersion of filtered CNTs over the continuous porous carrier-veil layer to form on the carrier-veil layer a filtered CNT structure comprising uniformly-distributed, randomly-oriented CNTs;
   vii) drying any residual liquid from the filtered CNT structure to form a continuous composite CNT-veil sheet including a CNT structure comprising a continuous phase of randomly-oriented, uniformly-distributed CNTs on the carrier-veil layer; and
   viii) removing the continuous composite CNT-veil sheet from the continuous conveying belt.

4. The process according to claim 1 wherein the continuous porous carrier material comprises a woven or meshed synthetic hydrophobic or hydrophilic polymer that filters the dispersed CNTs from the dispersing liquid of the aqueous suspension of the CNTs.

5. The process according to claim 1, wherein the CNT sheet has a basis weight of at least 1 gram CNT per square meter (gsm), and up to about 40 gsm, and a relative density (to water) of less than about 1.5.

6. The process according claim 5, wherein the CNTs are selected from the group consisting of CNTs that consist essentially of single wall CNTs (SWCNTs), CNTs that consist essentially of multi wall CNTs (MWCNTs), or a mixture thereof.

7. The process according claim 1, wherein the continuous porous carrier material has a width up to about 152 cm (60 inches).

8. The process according to claim 2, wherein the porous veil layer comprises a carbon fiber veil.

9. The process according to claim 3, wherein the carrier-veil layer comprises a carbon fiber veil.

10. The process according to claim 8, wherein the continuous phase of CNTs has a basis weight of at least 1 gsm and up to about 40 gsm, and a density relative to water of less than about 1.5.

11. The process according to claim 10, wherein the CNTs consist essentially of single wall CNTs.

12. The process according to claim 8, wherein the carbon fiber veil has a width up to about 152 cm (60 inches).

13. The process according to claim 9, wherein the continuous phase of CNTs has a basis weight of at least 1 gsm and up to about 40 gsm, and a density relative to water of less than about 1.5.

14. The process according to claim 13, wherein the CNTs consist essentially of single wall CNTs.

15. The process according to claim 9, wherein the carbon fiber veil has a width up to about 152 cm (60 inches).

16. The process according to claim 1, wherein in step iv), the continuous pool of the aqueous suspension of the CNTs further has a velocity that is two or more times faster than the linear velocity of the continuous porous carrier material.

17. The process according to claim 2, wherein in the step v), the continuous pool of the aqueous suspension of the CNTs further has a velocity that is two or more times faster than the linear velocity of the continuous porous carrier material and the porous veil layer.

18. The process according to claim 3, wherein in the step iv), the continuous pool of the aqueous suspension of the CNTs further has a velocity that is two or more times faster than the linear velocity of the continuous porous carrier-veil layer.

* * * * *